(12) United States Patent　(10) Patent No.: US 8,918,073 B2
Havlark et al.　(45) Date of Patent: Dec. 23, 2014

(54) WIRELESS TELECOMMUNICATIONS LOCATION BASED SERVICES SCHEME SELECTION

(75) Inventors: Arlene Havlark, Seattle, WA (US); Victor Burton, Bellevue, WA (US); John Ahrens, Maple Valley, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 993 days.

(21) Appl. No.: 11/730,085

(22) Filed: Mar. 29, 2007

(65) Prior Publication Data

US 2008/0242260 A1　Oct. 2, 2008

Related U.S. Application Data

(63) Continuation-in-part of application No. 10/379,940, filed on Mar. 6, 2003, now Pat. No. 7,200,380, which is a continuation of application No. 10/339,403, filed on Jan. 10, 2003, now abandoned.

(60) Provisional application No. 60/367,703, filed on Mar. 28, 2002.

(51) Int. Cl.
*H04M 11/00*　(2006.01)
*G01S 19/05*　(2010.01)
*G01S 5/02*　(2010.01)
*G01S 5/00*　(2006.01)

(52) U.S. Cl.
CPC ............... *G01S 19/05* (2013.01); *G01S 5/0252* (2013.01); *G01S 5/0054* (2013.01); *G01S 5/0236* (2013.01)
USPC ..................................... 455/404.2; 455/456.1

(58) Field of Classification Search
USPC .......... 455/435.1, 435.2, 456.1, 456.3, 456.5, 455/433, 404.2, 440, 456.4, 456.6, 456.2
See application file for complete search history.

(56) References Cited

U.S. PATENT DOCUMENTS

| | | |
|---|---|---|
| 4,972,484 A | 11/1990 | Theile |
| 5,283,570 A | 2/1994 | DeLuca |
| 5,311,516 A | 5/1994 | Kuznicki |
| 5,327,529 A | 7/1994 | Fults |
| 5,351,235 A | 9/1994 | Lahtinen |
| 5,530,655 A | 6/1996 | Lokhoff |
| 5,530,914 A | 6/1996 | McPheters |
| 5,539,829 A | 7/1996 | Lokhoff |

(Continued)

OTHER PUBLICATIONS

International Search Report received in PCT/US2012/000422 dated Dec. 10, 2012.

*Primary Examiner* — Myron K Wyche
(74) *Attorney, Agent, or Firm* — William H. Bollman

(57) ABSTRACT

An intelligent system for choosing selection schemes to be tried in a predetermined order for determining the location of a wireless mobile client, including retrieving a last known position record from a cache, checking serving network capability, choosing an initial selection scheme according to parameters including at least the required response time and the requested location method, including a method employing navigational satellites, attempting to retrieve a current position record, trying successive untried selection schemes in turn according to a predetermined algorithm if no current position record has been retrieved, and returning the current position record and updating the last known position record, or returning an error if no current position record has been retrieved, and returning the last known position record if an error has been returned, the last known position record exists in the cache and the last known position record has not expired.

15 Claims, 32 Drawing Sheets

(56) References Cited

U.S. PATENT DOCUMENTS

| | | |
|---|---|---|
| 5,636,276 A | 6/1997 | Brugger |
| 5,661,755 A | 8/1997 | Van De Kerkhof |
| 5,699,053 A | 12/1997 | Jonsson |
| 5,704,029 A | 12/1997 | Wright |
| 5,721,781 A | 2/1998 | Deo |
| 5,765,152 A | 6/1998 | Erickson |
| 5,771,353 A | 6/1998 | Eggleston |
| 5,774,670 A | 6/1998 | Montulli |
| 5,809,415 A | 9/1998 | Rossmann |
| 5,812,087 A | 9/1998 | Krasner |
| 5,841,396 A | 11/1998 | Krasner |
| 5,857,201 A | 1/1999 | Wright |
| 5,874,914 A | 2/1999 | Krasner |
| 5,896,369 A | 4/1999 | Warsta |
| 5,922,074 A | 7/1999 | Richard |
| 5,930,250 A | 7/1999 | Klok |
| 5,945,944 A | 8/1999 | Krasner |
| 5,946,629 A | 8/1999 | Sawyer |
| 5,960,362 A | 9/1999 | Grob |
| 5,974,300 A | 10/1999 | LaPorta |
| 5,983,099 A | 11/1999 | Yao |
| 5,983,109 A | 11/1999 | Montoya |
| 5,999,124 A | 12/1999 | Sheynblat |
| 6,002,936 A | 12/1999 | Roel-Ng |
| 6,032,051 A | 2/2000 | Hall |
| 6,052,081 A | 4/2000 | Krasner |
| 6,058,338 A | 5/2000 | Agashe |
| 6,061,018 A | 5/2000 | Sheynblat |
| 6,061,346 A | 5/2000 | Nordman |
| 6,064,336 A | 5/2000 | Krasner |
| 6,081,229 A | 6/2000 | Soliman |
| 6,085,320 A | 7/2000 | Kaliski |
| 6,104,931 A | 8/2000 | Havinis |
| 6,115,611 A | 9/2000 | Kimoto |
| 6,124,810 A | 9/2000 | Segal |
| 6,131,067 A | 10/2000 | Girerd |
| 6,133,874 A | 10/2000 | Krasner |
| 6,134,483 A | 10/2000 | Vayanos |
| 6,150,980 A | 11/2000 | Krasner |
| 6,178,505 B1 | 1/2001 | Schneider |
| 6,178,506 B1 | 1/2001 | Quick |
| 6,185,427 B1 | 2/2001 | Krasner |
| 6,188,354 B1 | 2/2001 | Soliman |
| 6,188,909 B1 | 2/2001 | Alanara |
| 6,189,098 B1 | 2/2001 | Kaliski |
| 6,199,113 B1 | 3/2001 | Alegre |
| 6,205,330 B1 | 3/2001 | Winbladh |
| 6,208,290 B1 | 3/2001 | Krasner |
| 6,215,441 B1 | 4/2001 | Moeglein |
| 6,219,557 B1 | 4/2001 | Havinis |
| 6,239,742 B1 | 5/2001 | Krasner |
| 6,247,135 B1 | 6/2001 | Feague |
| 6,249,873 B1 | 6/2001 | Richard |
| 6,260,147 B1 | 7/2001 | Quick |
| 6,275,692 B1 | 8/2001 | Skog |
| 6,275,849 B1 | 8/2001 | Ludwig |
| 6,308,269 B2 | 10/2001 | Proidl |
| 6,313,786 B1 | 11/2001 | Sheynblat |
| 6,321,091 B1 | 11/2001 | Holland |
| 6,321,257 B1 | 11/2001 | Kotola |
| 6,324,542 B1 | 11/2001 | Wright |
| 6,327,473 B1 | 12/2001 | Soliman |
| 6,333,919 B2 | 12/2001 | Gaffney |
| 6,360,093 B1 | 3/2002 | Ross |
| 6,367,019 B1 | 4/2002 | Ansell |
| 6,370,389 B1 | 4/2002 | Isomursu |
| 6,377,209 B1 | 4/2002 | Krasner |
| 6,397,208 B1 | 5/2002 | Lee |
| 6,400,314 B1 | 6/2002 | Krasner |
| 6,400,943 B1 | 6/2002 | Montoya |
| 6,400,958 B1 | 6/2002 | Isomursu |
| 6,411,254 B1 | 6/2002 | Moeglein |
| 6,421,002 B2 | 7/2002 | Krasner |
| 6,429,808 B1 | 8/2002 | King |
| 6,433,734 B1 | 8/2002 | Krasner |
| 6,449,473 B1 | 9/2002 | Raivisto |
| 6,449,476 B1 | 9/2002 | Hutchison |
| 6,456,952 B1 | 9/2002 | Nathan |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,464 B1 | 2/2003 | Santoff |
| 6,519,466 B2 | 2/2003 | Pande |
| 6,522,682 B1 | 2/2003 | Kohli |
| 6,526,026 B1 | 2/2003 | Menon |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,776 B1 | 4/2003 | Joong |
| 6,549,844 B1 | 4/2003 | Egberts |
| 6,560,534 B2 | 5/2003 | Abraham |
| 6,570,530 B2 | 5/2003 | Gaal |
| 6,571,095 B1 | 5/2003 | Koodli |
| 6,574,558 B2 | 6/2003 | Kohli |
| 6,584,552 B1 | 6/2003 | Kuno et al. |
| 6,594,500 B2 | 7/2003 | Bender |
| 6,597,311 B2 | 7/2003 | Sheynblat |
| 6,600,927 B2 | 7/2003 | Hamilton |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,621,452 B2 | 9/2003 | Knockeart |
| 6,621,810 B1 | 9/2003 | Leung |
| 6,628,233 B2 | 9/2003 | Knockeart |
| 6,633,255 B2 | 10/2003 | Krasner |
| 6,640,184 B1 | 10/2003 | Rabe |
| 6,661,372 B1 | 12/2003 | Girerd |
| 6,665,539 B2 | 12/2003 | Sih |
| 6,665,541 B1 | 12/2003 | Krasner |
| 6,677,894 B2 | 1/2004 | Sheynblat |
| 6,680,694 B1 | 1/2004 | Knockeart |
| 6,680,695 B2 | 1/2004 | Turetzky |
| 6,691,019 B2 | 2/2004 | Seeley |
| 6,694,258 B2 | 2/2004 | Johnson |
| 6,694,351 B1 | 2/2004 | Shaffer |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Panda |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynbai |
| 6,721,871 B2 | 4/2004 | Piispanen |
| 6,724,342 B2 | 4/2004 | Bloebaum |
| 6,725,159 B2 | 4/2004 | Krasner |
| 6,731,940 B1 | 5/2004 | Nagendran |
| 6,738,014 B2 | 5/2004 | Ueda |
| 6,738,800 B1 | 5/2004 | Aquillon |
| 6,741,842 B2 | 5/2004 | Goldberg |
| 6,744,856 B2 | 6/2004 | Karnik |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,544 B2 | 6/2004 | Rangarajan |
| 6,757,545 B2 * | 6/2004 | Nowak et al. ............ 455/456.2 |
| 6,771,742 B2 | 8/2004 | McCalmont |
| 6,772,340 B1 | 8/2004 | Peinado |
| 6,775,655 B1 | 8/2004 | Peinado et al. |
| 6,775,802 B2 | 8/2004 | Gaal |

(56) References Cited

U.S. PATENT DOCUMENTS

| | | |
|---|---|---|
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McGraw |
| 6,799,049 B1 | 9/2004 | Zellner |
| 6,799,050 B1 | 9/2004 | Krasner |
| 6,801,159 B2 | 10/2004 | Swope |
| 6,804,524 B1 | 10/2004 | Vandermenden |
| 6,807,534 B1 | 10/2004 | Erickson |
| 6,810,323 B1 | 10/2004 | Bullock |
| 6,813,501 B2 * | 11/2004 | Kinnunen et al. ......... 455/456.2 |
| 6,813,560 B2 | 11/2004 | van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,820,269 B2 | 11/2004 | Baucke |
| 6,829,475 B1 | 12/2004 | Lee |
| 6,832,373 B2 | 12/2004 | O'Neill |
| 6,839,021 B2 | 1/2005 | Sheynblat |
| 6,842,715 B1 | 1/2005 | Gaal |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,734 B2 | 3/2005 | Voor |
| 6,868,074 B1 | 3/2005 | Hanson |
| 6,873,854 B2 | 3/2005 | Crockett |
| 6,885,869 B2 | 4/2005 | Rarth |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,912,395 B2 | 6/2005 | Benes |
| 6,915,208 B2 | 7/2005 | Garin |
| 6,917,331 B2 | 7/2005 | Gronemeyer |
| 6,922,565 B2 | 7/2005 | Rhodes |
| 6,930,634 B2 | 8/2005 | Peng |
| 6,937,187 B2 | 8/2005 | Van Diggelen |
| 6,937,872 B2 | 8/2005 | Krasner |
| 6,940,950 B2 | 9/2005 | Dickinson |
| 6,941,144 B2 | 9/2005 | Stein |
| 6,944,540 B2 | 9/2005 | King |
| 6,950,058 B1 | 9/2005 | Davis |
| 6,957,073 B2 | 10/2005 | Bye |
| 6,961,562 B2 | 11/2005 | Ross |
| 6,963,557 B2 | 11/2005 | Knox |
| 6,963,748 B2 * | 11/2005 | Chithambaram et al. . 455/456.1 |
| 6,965,754 B2 | 11/2005 | King |
| 6,965,767 B2 | 11/2005 | Maggenti |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohies |
| 6,996,720 B1 | 2/2006 | DeMello |
| 7,024,321 B1 | 4/2006 | Deninger |
| 7,024,393 B1 | 4/2006 | Peinado |
| 7,047,411 B1 | 5/2006 | DeMello |
| 7,065,351 B2 | 6/2006 | Carter |
| 7,065,507 B2 | 6/2006 | Mohammed |
| 7,079,857 B2 | 7/2006 | Maggenti |
| 7,103,018 B1 | 9/2006 | Hansen |
| 7,103,574 B1 | 9/2006 | Peinado |
| 7,106,717 B2 | 9/2006 | Rousseau |
| 7,136,838 B1 | 11/2006 | Peinado |
| 7,151,946 B2 | 12/2006 | Maggenti |
| 7,200,380 B2 * | 4/2007 | Havlark et al. ............ 455/404.2 |
| 7,209,969 B2 | 4/2007 | Lahti |
| 7,218,940 B2 | 5/2007 | Niemenman |
| 7,221,959 B2 | 5/2007 | Lindqvist |
| 7,245,910 B2 * | 7/2007 | Osmo ........................ 455/432.1 |
| 7,260,186 B2 | 8/2007 | Zhu |
| 7,403,939 B1 | 7/2008 | Virdy |
| 7,477,903 B2 | 1/2009 | Wilcock ..................... 455/456.1 |
| 7,627,331 B2 * | 12/2009 | Winterbottom et al. ... 455/456.1 |
| 7,783,297 B2 | 8/2010 | Ishii |
| RE42,927 E | 11/2011 | Want |
| 2002/0037735 A1 | 3/2002 | Maggenti |
| 2002/0042260 A1 | 4/2002 | Saucedo |
| 2002/0052214 A1 | 5/2002 | Maggenti |
| 2002/0061760 A1 | 5/2002 | Maggenti |
| 2002/0069529 A1 | 6/2002 | Wieres |
| 2002/0085515 A1 | 7/2002 | Jayne |
| 2002/0085538 A1 | 7/2002 | Leung |
| 2002/0112047 A1 | 8/2002 | Kushwaha |
| 2002/0123354 A1 * | 9/2002 | Nowak .......................... 455/456 |
| 2002/0147023 A1 | 10/2002 | Sawada |
| 2002/0164998 A1 | 11/2002 | Younis |
| 2002/0173317 A1 | 11/2002 | Nykanen |
| 2003/0007886 A1 | 1/2003 | Hwa |
| 2003/0009602 A1 | 1/2003 | Jacobs |
| 2003/0037163 A1 | 2/2003 | Kitada |
| 2003/0044654 A1 | 3/2003 | Holt |
| 2003/0054835 A1 | 3/2003 | Gutowski et al. |
| 2003/0065788 A1 | 4/2003 | Salomaki |
| 2003/0072318 A1 | 4/2003 | Lam |
| 2003/0078064 A1 | 4/2003 | Chan |
| 2003/0081557 A1 | 5/2003 | Mettala |
| 2003/0101329 A1 | 5/2003 | Lahti |
| 2003/0103484 A1 | 6/2003 | Oommen |
| 2003/0118160 A1 | 6/2003 | Holt et al. |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0182053 A1 | 9/2003 | Swope et al. |
| 2003/0186709 A1 | 10/2003 | Rhodes |
| 2003/0196105 A1 | 10/2003 | Fineberg |
| 2003/0201931 A1 | 10/2003 | Durst |
| 2003/0204640 A1 | 10/2003 | Sahinoja |
| 2003/0223381 A1 | 12/2003 | Schroderus |
| 2004/0002326 A1 | 1/2004 | Maher |
| 2004/0041729 A1 | 3/2004 | Rowitch |
| 2004/0068724 A1 | 4/2004 | Gardner, III |
| 2004/0098497 A1 | 5/2004 | Banet |
| 2004/0132465 A1 | 7/2004 | Matilla |
| 2004/0198375 A1 | 10/2004 | Schwengler et al. |
| 2004/0203746 A1 * | 10/2004 | Knauerhase et al. ...... 455/432.1 |
| 2004/0203854 A1 | 10/2004 | Nowak |
| 2004/0204847 A1 | 10/2004 | Yanai |
| 2004/0205151 A1 | 10/2004 | Sprigg |
| 2004/0225878 A1 | 11/2004 | Costa-Requena |
| 2004/0229632 A1 | 11/2004 | Flynn |
| 2004/0242238 A1 | 12/2004 | Wang |
| 2004/0267445 A1 | 12/2004 | De Luca |
| 2005/0028034 A1 | 2/2005 | Gantman |
| 2005/0039178 A1 | 2/2005 | Marolia |
| 2005/0041578 A1 | 2/2005 | Huotari |
| 2005/0043037 A1 | 2/2005 | Ioppe |
| 2005/0074107 A1 | 4/2005 | Renner |
| 2005/0086467 A1 | 4/2005 | Asokan |
| 2005/0112030 A1 | 5/2005 | Gaus |
| 2005/0119012 A1 | 6/2005 | Merheb |
| 2005/0125376 A1 | 6/2005 | Curtis |
| 2005/0209995 A1 | 9/2005 | Aksu |
| 2005/0213716 A1 | 9/2005 | Zhu |
| 2005/0238526 A1 | 10/2005 | Turner |
| 2005/0239458 A1 * | 10/2005 | Hurtta ........................ 455/432.1 |
| 2005/0259675 A1 | 11/2005 | Tuohino |
| 2006/0010200 A1 | 1/2006 | Mousseau |
| 2006/0053225 A1 | 3/2006 | Poikselka |
| 2006/0128395 A1 | 6/2006 | Muhonen |
| 2006/0212558 A1 | 9/2006 | Sahinoja |
| 2006/0234639 A1 | 10/2006 | Kushwaha |

(56) References Cited

U.S. PATENT DOCUMENTS

| | | |
|---|---|---|
| 2006/0234698 A1 | 10/2006 | Fok |
| 2006/0258380 A1 | 11/2006 | Liebowitz |
| 2006/0293066 A1 | 12/2006 | Edge |
| 2007/0026854 A1 | 2/2007 | Nath |
| 2007/0026871 A1 | 2/2007 | Wager |
| 2007/0030539 A1 | 2/2007 | Nath |
| 2007/0041516 A1 | 2/2007 | Dickinson |
| 2007/0049288 A1 | 3/2007 | Lamprecht |
| 2007/0060097 A1 | 3/2007 | Edge |
| 2007/0072553 A1 | 3/2007 | Barbera |
| 2007/0149213 A1 | 6/2007 | Lamba |
| 2007/0182631 A1 | 8/2007 | Berlinsky |
| 2007/0201623 A1 | 8/2007 | Hines |
| 2007/0206568 A1 | 9/2007 | Silver |
| 2007/0206613 A1 | 9/2007 | Silver |
| 2008/0080691 A1 | 4/2008 | Dolan |
| 2008/0117859 A1 | 5/2008 | Shahidi |
| 2008/0235511 A1 | 9/2008 | O'Brien |
| 2008/0249967 A1 | 10/2008 | Flinn |
| 2009/0224931 A1 | 9/2009 | Dietz |
| 2009/0298488 A1 | 12/2009 | Snapp |
| 2010/0029244 A1 | 2/2010 | Moodbidri |
| 2010/0069034 A1 | 3/2010 | Dickinson |
| 2010/0125892 A1 | 5/2010 | Tanizawa |
| 2011/0131414 A1 | 6/2011 | Cheng |
| 2011/0165861 A1 | 7/2011 | Wilson |

* cited by examiner

FIG. 14

| Method 0 | Return Error -- this request cannot be satisfied. If there is an entry in the PositionXLPDB, NetworkCache, return it. |
|---|---|
| Method 1 | MAP_ProvideSubscriberInfo |
| Method 2 | MAP_AnyTimeInterrogation |
| Method 3 | MAP_MT_ForwardShortMessage<br>MAP_ProvideSubscriberInfo |
| Method 4 | MAP_SendRoutingForShortMessage<br>MAP_MT_ForwardShortMessage<br>MAP_ProvideSubscriberInfo |
| Method 5 | MAP_ProvideSubscriberLocation |
| Method 6 | MAP_SendRoutingForLCS<br>MAP_ProvideSubscriberLocation |
| Method 7 | A-GPS |
| Method 8 | If (HomeCarrierNetworkType == 3G) then MAP_SendRoutingForLCS;<br>Else then MAP_SendingRoutingforSM; |
| Method 9 | MAP_SendRoutingForShortMessage<br>MAP_MT_ForwardShortMessage<br>MAP_AnyTimeInterrogation |
| Method 10 | MAP_MT_ForwardShortMessage<br>MAP_AnyTimeInterrogation |

| | |
|---|---|
| Response Time | This parameter comes from the Usher_TIF_LocationRequest. |
| Location Method | This parameter comes from the Usher_TIF_LocationRequest. |
| Terminal Capability | This parameter comes from the Usher_TIF_LocationRequest, but will not be used by H3G at product launch. |
| Position Request Type | This parameter comes from the Usher_TIF_LocationRequest. |
| MSC in Cache | This parameter comes from the Position XLPDB, NetworkCache table. |
| MSC MAP Version Home | This parameter is derived from the MSC message version numbers in the GSMProvDB, MSC table for the provSubLoc (MAP_Provide_Subscriber_Location_message). |
| Network Type | This parameter comes a configurable in TIF.cfg |
| MSC Network Type | This parameter comes from the GSMProvDB. First the MSC table is queried for the PLMN ID. Then the PLMN table is queried for Network type. If the Network type is HOME_CARRIER, then the configurable is checked. This is the default network type for the MSC. However, this can be overridden by the following logic:<br>-if the values for the versions of all messages are zero, it is assumed the versioning for this MSC is not provisioned -- the default is used.<br>If version numbers are supplied for at least some of the MAP messages:<br>- if provSubLocVersion >=3, msc network type = 3G.<br>- if 0 < provSubInfoVersion < 3, msc network type = 2G.<br>- else, msc network type = 2.5G. |
| Roaming | This parameter comes from the GSMProvDB. First the MSC table is queried for the PLMN ID. Then the PLMN table is queried for Network Type. If the Network Type is HOME_CARRIER, roaming is false. If the Network Type is anything other than HOME_CARRIER, Roaming is true. Note that this decision can only be made once the MSC is obtained, that is, after the MAP_SendRoutingInfo_for_SM has been sent. |

FIG. 15

WIRELESS TELECOMMUNICATIONS LOCATION BASED SERVICES SCHEME SELECTION

This application is a continuation-in-part application of U.S. application Ser. No. 10/379,940, filed Mar. 6, 2003, entitled "Wireless Telecommunications Location Based Services Scheme Selection", now U.S. Pat. No. 7,200,380; which is a continuation application of co-pending U.S. application Ser. No. 10/339.403, filed Jan. 10, 2003, entitled "Wireless Telecommunications Location Based Services Scheme Selection"; which in turn claims priority to U.S. Provisional Appl. No. 60/367,707, filed Mar. 28, 2002, entitled "Wireless Telecommunications Location Based Services Scheme Selection" the entirety of which are expressly incorporated herein by reference.

BACKGROUND OF THE INVENTION

1. Field of the Invention

This invention relates generally to wireless communication carriers. More particularly, it relates to wireless telecommunications location-based services.

2. Background of Related Art

The position of a wireless client may be used for a variety of different purposes. The position of a mobile client may be provided in response to a request for the same via a wireless network. Position or location of a wireless device (e.g., a cell phone) may be used, e.g., in a vehicle-based navigation system, or to otherwise generally display or inform a requesting party of the position of a particular wireless device.

SUMMARY OF THE INVENTION

In accordance with the principles of the present invention, a method of responding in a wireless network to a location request comprises determining a sensitivity of delay to a response to the location request. Based on the determined sensitivity, a selection is made between a cached last known position of a relevant subscriber, and newly determined position information.

In accordance with another aspect of the present invention, a method of responding in a wireless network to a location request comprises determining a sensitivity of delay to a response to the location request. Based on the determined sensitivity, a selection is made between retrieval of a cached last known position record of a relevant subscriber, if available, and a next untried selection scheme if no current position record has been retrieved.

BRIEF DESCRIPTION OF THE DRAWINGS

Features and advantages of the present invention will become apparent to those skilled in the art from the following description with reference to the drawings, in which:

FIG. 14 shows method definitions of another embodiment of the present invention.

FIG. 15 exemplary scheme selection parameters of the embodiment shown in FIG. 14.

DETAILED DESCRIPTION OF ILLUSTRATIVE EMBODIMENTS

The present invention provides an intelligent system that determines the location of a wireless mobile user by choosing selection schemes according to input parameters. The input parameters may include, e.g., a required response time, and/or a requested location method. The selection schemes may also be chosen according to the capabilities of the particular user's mobile device and the wireless network, to the availability of a navigational satellite and/or of a cached position record, to the version number of the utilized software, and/or to whether or not the mobile client is roaming. In the event that repeated tries are necessary, successive selection schemes to be tried are determined, as well as the order in which the selection schemes are to be tried.

A process according to another aspect of the present invention includes retrieving a last known position record from a cache, checking the capabilities of a serving network, and choosing an initial selection scheme according to parameters. The parameters preferably include at a minimum a required response time and a requested location method. The requested location method may include a method employing a navigational satellite.

Yet another process in accordance with another aspect of the present invention includes attempting to retrieve a current position record by an initial selection scheme. If no current position record is retrieved, successive untried selection schemes are tried in turn according to a predetermined algorithm until a current position record is returned. The last known position record is updated, or an error is returned if a current position record has not been retrieved. The last known position record is returned if an error has been returned, if the last known position record exists in the cache, and the last known position record has not expired.

In a wireless network, there are potentially several messages (e.g., Signaling System No. 7 (SS7)) messages which can be used to request and thereby obtain a subscriber's location. The particular process used to obtain the location is referred to herein as "scheme selection".

Scheme selection in accordance with the principles of the present invention determines which of a plurality of possible messages to send, as well as a preferred order in which to send them, particularly when a message fails to result in obtaining a subscriber's location.

A location services platform scheme selection service in accordance with the principles of the present invention makes an intelligent choice between multiple possible SS7 messages used to obtain a subscriber's location. In the disclosed embodiments, the choice is preferably based upon a combination of location request parameters, e.g., the subscriber's equipment capabilities, the network type, and/or the capabilities of the network.

The present invention may be implemented in any suitable location service platform.

Figure 1:
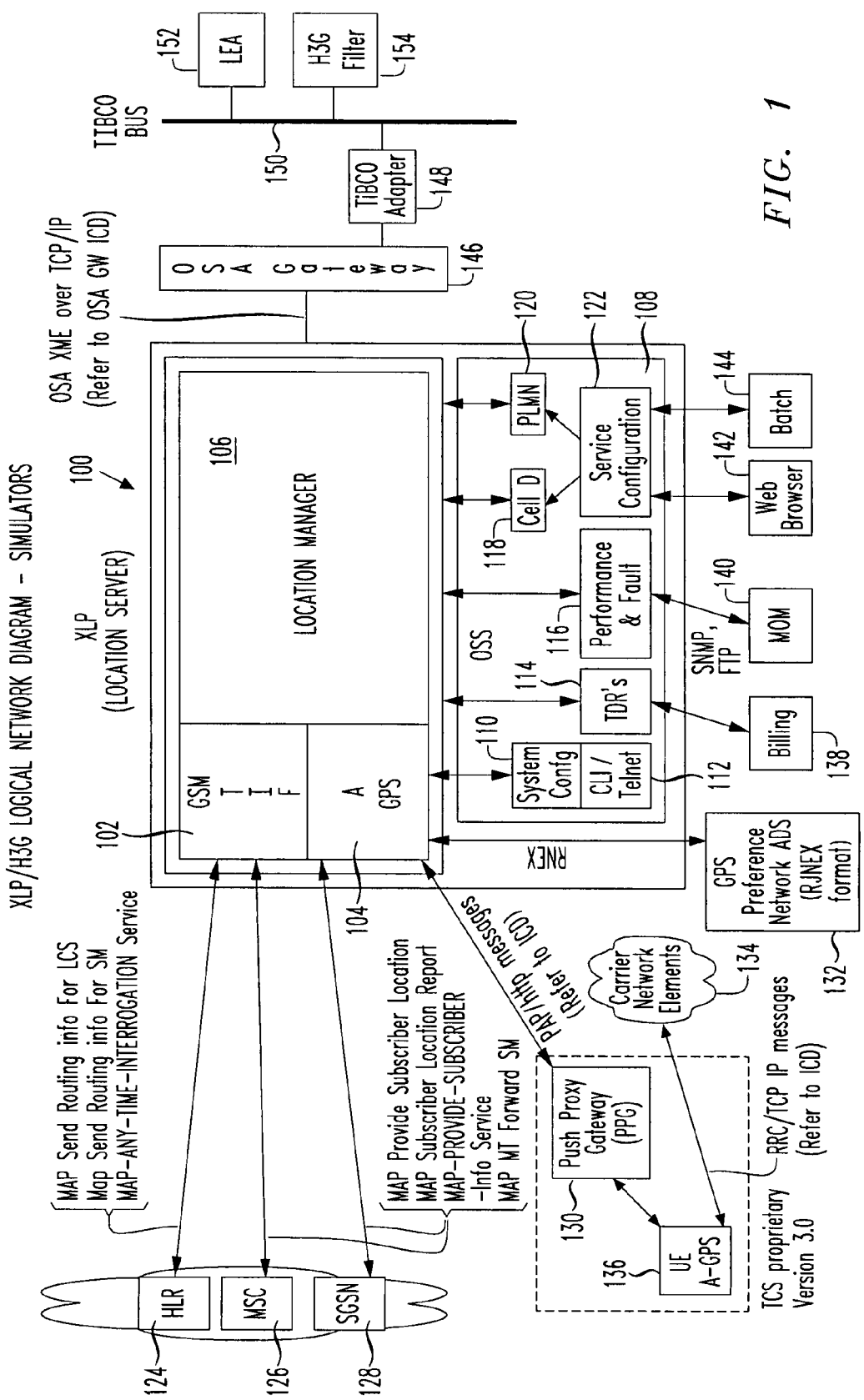
FIG. 1 shows exemplary network architecture of scheme selection in a location platform, in accordance with the principles of the present invention.

FIG. 1 shows exemplary network architecture for scheme selection in a location platform, in accordance with the principles of the present invention.

In FIG. 1, a location platform (XLP) location server 100 includes a Telecommunication InterFace (TIF) 102, an Assisted Global Positioning Satellite (Assisted GPS, or AGPS) unit 104, a location manager 106 and an Operations Support System (OSS) 108. The OSS 108 further includes system configuration means 110 with a Command Line Interface/Telnet interface 112, Transaction Detail Records (TDRs) 114, a performance and fault module 116, Cell Data 118, Public Land Mobile Network (PLMN) database 120 and service configuration means 122. TIF 102 is connected to Home Location Register (HLR) 124 and Mobile Switch Center (MSC) 126, and Assisted GPS 104 is connected to Serving GPRS Support Node (SGSN) 128 and Push Proxy Gateway (PPG) 130 and GPS reference network 132. Carrier network elements 134 are connected to XLP 100, and both carrier network elements 134 and PPG 130 are connected to User Equipment 136. Billing means 138 are connected to Transaction Detail Records (TDRs) 114. Message Oriented Middleware (MOM) 140 is connected to performance and fault module 116. Service configuration means 122 are configured to be accessed by a web browser 142 or by batch means 144. XLP 100 is also connected via OSA (Open Services Architecture) gateway 146 and adapter 148 to bus 150, which in turn is connected to Location Enterprise Application (LEA) 152.

A plurality of methods may be implemented. In one disclosed embodiment, a Xypoint™ Location Platform (XLP) Telecommunication InterFace (TIF) scheme selection function is responsible for deciding which method should be used when the XLP receives a location service request from a location application, based on the parameters of the request, and the capabilities of core network components. In addition, if a method fails, the Telecommunication InterFace (TIF) scheme selection function may also decide whether another method should be triggered, or if an error should instead be reported.

Once a method is selected, a sequence of MAP messages may be initiated by the Telecommunication InterFace (TIF) to the core network, and responses from the core network may be processed by the TIF as well, or Assisted GPS related messages will be exchanged between the XLP and the core network.

Preferably, the Home Location Register (HLR)s will support 3rd Generation Partnership Project (3GPP) Release 99 version of the Mobile Application Part (MAP). In the disclosed embodiments, the XLP uses only the Release 99 MAP version to communicate with the Home Location Register (HLR). It is assumed for the purposes of the enclosed embodiments that other network components (e.g., of roaming partners) may be compliant with MAP version 1, MAP version 2 or MAP version 3 for Phase 2+.

Location Request

Table 1 shows exemplary parameters that may be provided by an Immediate Request. The parameters are preferably passed through an Open Services Architecture (OSA) interface.

TABLE 1

Parameters of location request

| Parameter name | Notes |
| --- | --- |
| Priority | NORMAL or HIGH |
| Accuracy | Unsigned Long (radius in meters) |
| Type | CURRENT, CURRENT_OR_LAST_KNOWN, or INITIAL. |
| ResponseTime | NO_DELAY, return initial or last known; LOW_DELAY, attempt update but return best available within time constraint; |

TABLE 1-continued

Parameters of location request

| Parameter name | Notes |
|---|---|
| | DELAY_TOLERANT, get updated value; USE_TIMER_VALUE, get current position within response time requirement. |
| AltitudeRequested | Altitude request flag. |
| RequestedLocation Method | Network = default or AGPS |
| Timer | Time in seconds to respond used for USE_TIMER_VALUE responseTime. |

Main Process of Scheme Selection

Figure 2:
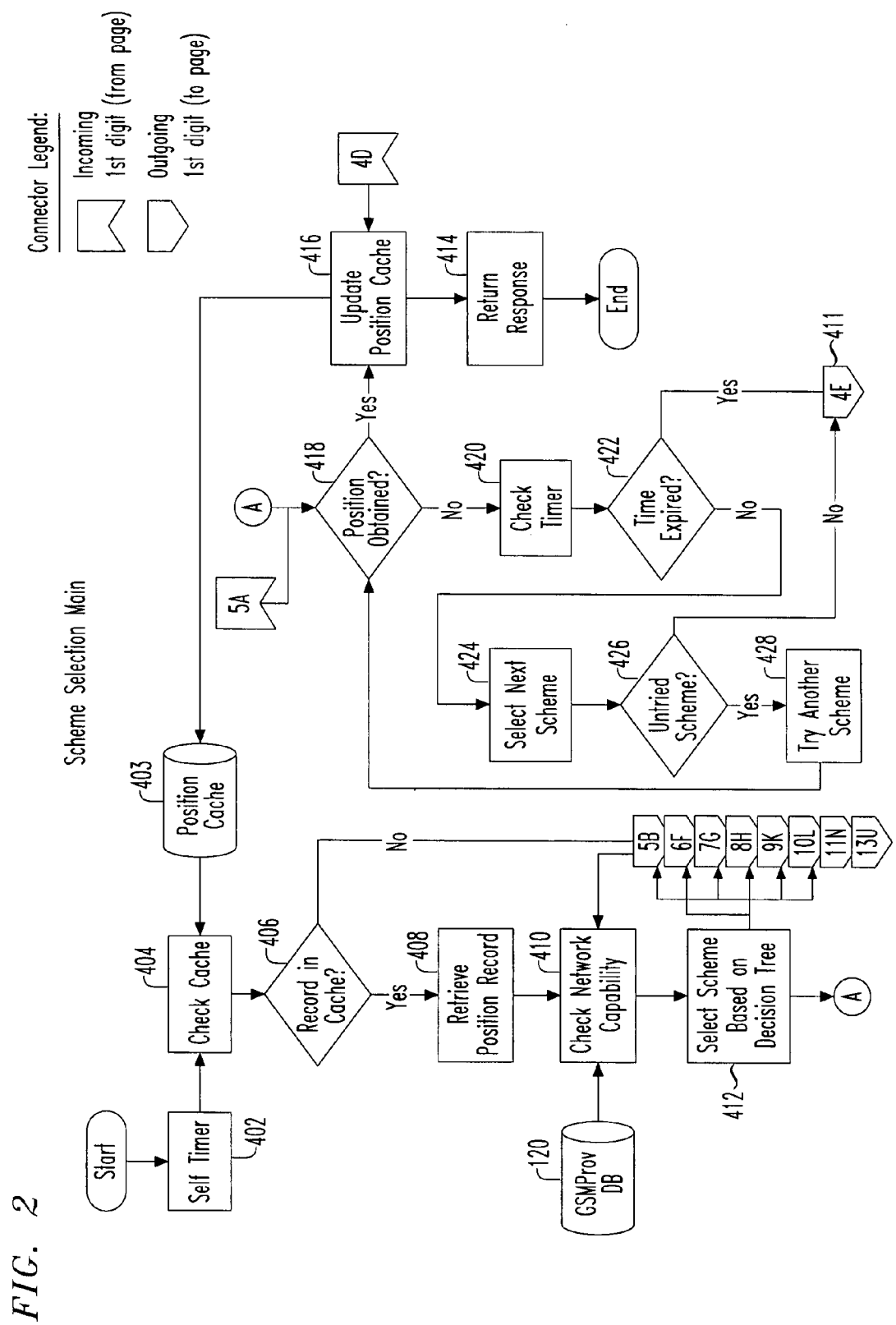
FIG. 2 shows an exemplary scheme selection main process, in accordance with the principles of the present invention.

FIG. 2 shows an exemplary scheme selection main process, in accordance with the principles of the present invention.

In particular, when receiving a location request, the Telecommunication InterFace (TIF) 102 starts a timer in step 402. The timer value is either indicated by the received request, or is set to a default value when a timer value is not provided. Based on the target subscriber identifier, Mobile Station ISDN (MSISDN), the Telecommunication InterFace (TIF) 102 checks the Position Cache database 403 in step 404 and determines whether a position record exists in step 406. If a position record exists, the Telecommunication InterFace (TIF) 102 then retrieves the record in step 408 and checks the serving network (meaning Mobile Switch Center (MSC) or Serving GPRS Support Node (SGSN)) capability in step 410 from a pre-provisioned Public Land Mobile Network (PLMN) database 120.

Figure 3:
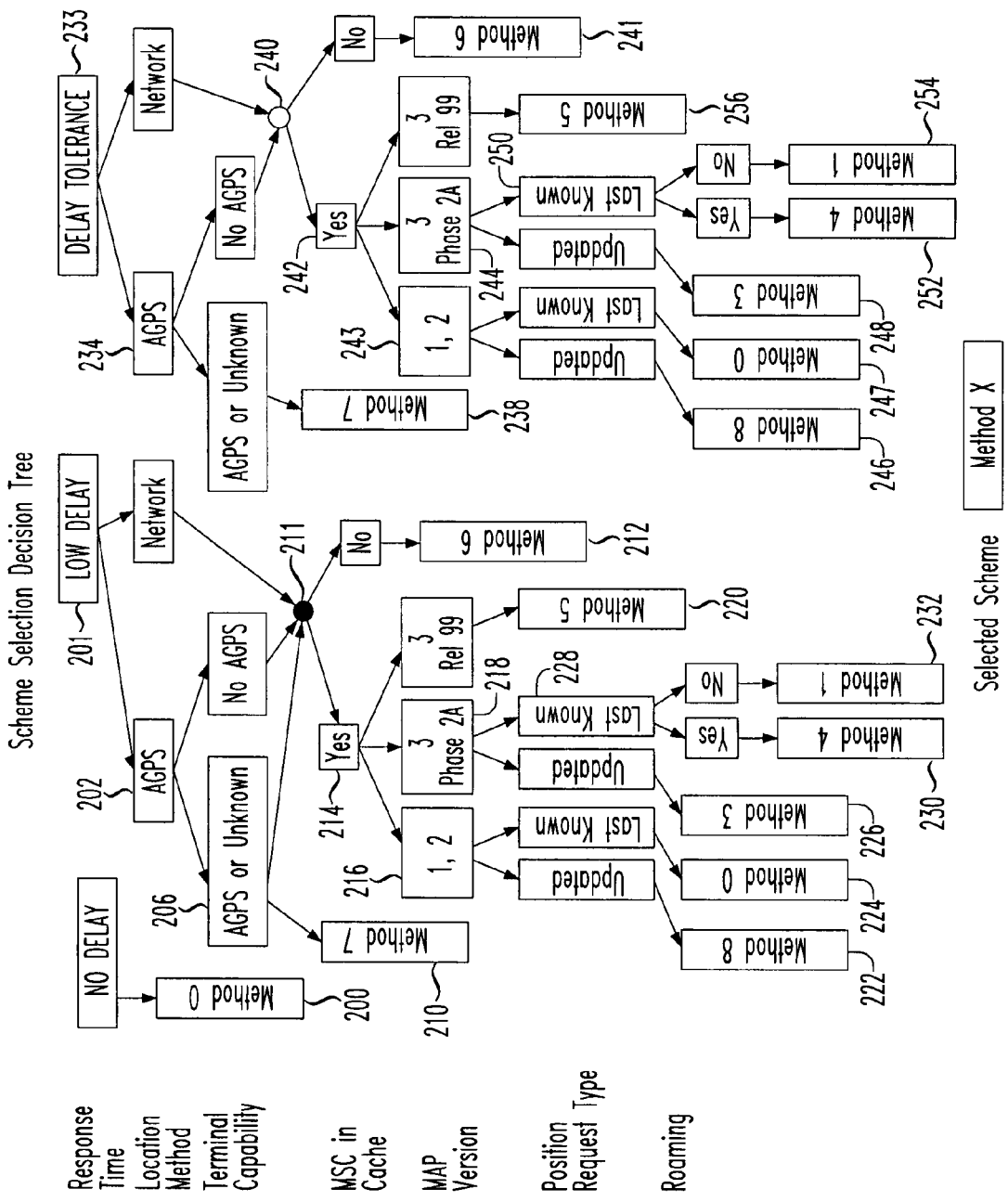
FIG. 3 shows an exemplary scheme selection decision tree, in accordance with one aspect of the present invention.
Figure 4:
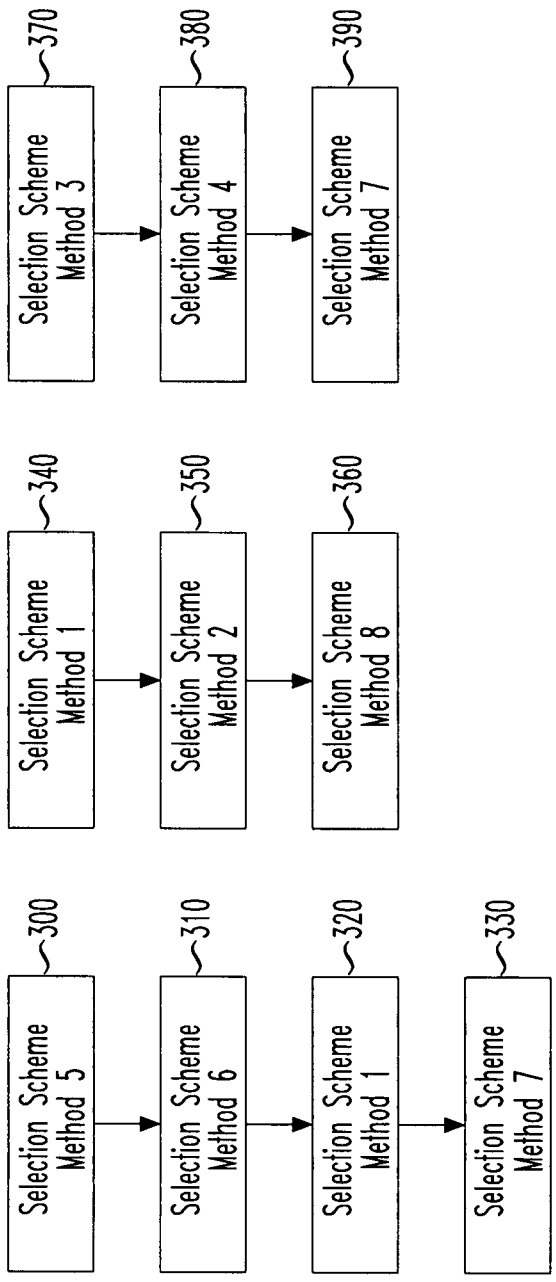
FIG. 4 shows a strategy for selecting an alternate scheme for a retry, in accordance with the principles of the present invention.

With all this information, including the request parameters and potential network capability, the Telecommunication InterFace (TIF) 102 uses the logic defined in FIG. 3 to select a method to retrieve the position information from the core network in step 412. FIG. 4 also shows the mechanism for possible retry once a method fails. FIGS. 3 and 4 will be discussed a bit further down.

In step 418 it is determined whether a position has been obtained, and if so, then the method proceeds to step 416 or if not, then in step 420 the timer is checked. In step 422, it is determined whether the timer has expired, and if not, then the next selection scheme is selected in step 424. In step 426 it is determined whether the selected scheme has been tried before, and if the scheme is untried, then in step 428 the selected scheme is tried, and then the method returns to step 418.

In a successful scenario, including the case with several retries, the Telecommunication InterFace (TIF) 102 will return the retrieved position information to the OSA (Open Services Architecture) interface in step 414, which passes to the location application. At the same time, the Telecommunication InterFace (TIF) 102 also updates the Position Cache database 403 in step 416.

In an unsuccessful scenario, in step 411 the Telecommunication InterFace (TIF) 102 will return the last known position information retrieved from the Position Cache database 403 with an error, or just an error if no cached location information is available (or the information expires).

Exemplary Scenarios

The following methods have been defined as exemplary schemes for an XLP to use to retrieve location information, either from a core network or locally from a cache database of the XLP.

Method 0: Requested position not obtainable, existing information from the cache database, if it is not expired, will be returned if available.

Method 1: Use MAP_Provide_Subscriber_Info and cached MSC-number to retrieve the requested position information.

Method 2: Use MAP_Any_Time_Interrogation to retrieve the requested position information.

Method 3: Use Mobile Terminated (MT) Short Message (refresh location information), MAP_Provide_Subscribe_Info and cached MSC-number (Mobile Switch Center-number) to retrieve the requested position information. (Phase 2+)

Method 4: When a cached MSC is not available, use MAP_Send_Rou8ting_For_S_M to the HLR to obtain the MSC number. Then, use the mobile terminated (MT) short message to refresh location information filled by the MAP_Provide_Subscriber_Info.

Method 5: Use MAP_Provide_Subscriber_Location and cached MSC-number to retrieve the requested position information. (Release 99)

Method 6: When a cached MSC is not available, use MAP_Send_Routing for LCS to obtain the MSC number, then use MAP_Provide_Subscriber_Location to retrieve the requested position information. (Release 99)

Method 7: Use Assisted GPS (AGPS) to retrieve the requested position information. (Release 99).

Method 8: Use MAP_Send_Routing_Info_For_SM to retrieve the current MSC-number when no cached MSC-number is available.

Detailed Scheme Selection

FIG. 3 shows an exemplary scheme selection decision tree, in accordance with one aspect of the present invention.

If No Delay is required, then AGPS and core network requests are not possible, and the Method 0 is selected in step 200.

Alternatively, if Low Delay is required, then in step 201 only core network methods are selected. In step 211 the internal database 403 is queried to determine whether location information of the target subscriber is cached in the database 403. If the location information is not cached in the database 403, then in step 212 Method 6 is selected. If the location information is cached in the database 403, then in step 214 the MAP version is determined. If the MAP version is Release 99, then in step 220 Method 5 is selected. If the MAP version is 2+, then in step 218 it is determined whether the position request type is Updated. If the position request type is Updated, then in step 226 Method 3 is selected. If not, then in step 228 it is determined whether or not Roaming applies. If the mobile is roaming, then Method 9 is selected in step 230, and if not, then in step 232 Method 1 is selected. If the MAP version is other than 2+ or Release 99, then in step 216 it is determined whether the position request type is Updated. If so, then in step 222 Method 8 is selected, and if not, then in step 224 Method 0 is selected.

Similarly, if the Response Time is Delay Tolerant, then in step 233 either AGPS or Network is selected according to the requested Location Method. If AGPS was requested, then in step 234 the terminal capability is determined, and if the terminal is capable of AGPS or unknown, then in step 238 Method 7 is selected. If either Network was selected in step 233, or it was determined that the terminal capability did not include AGPS in step 234, then in step 240 the internal database 403 is queried to determine whether location information of the target subscriber is cached in the database 403. If the location information is not cached in the database 403, then in step 241 Method 6 is selected. If the location information is cached in the database 403, then in step 242 the MAP version is determined. If the MAP version is Release 99, then in step 256 Method 5 is selected. If the MAP version is 2+, then in step 244 it is determined whether the position request type is Updated. If the position request type is Updated, then in step 248 Method 3 is selected. If not, then in step 250 it is determined whether or not Roaming applies. If the mobile is not roaming, then Method 4 is selected in step 252, and if not, then in step 254 Method 1 is selected. If the MAP version is other than 2+ or Release 99, then in step 243 it is determined whether the position request type is Updated. If so, then in step 246 Method 8 is selected, and if not, then in step 247 Method 0 is selected.

As discussed above, FIG. 3 presents a key concept of scheme selection. When receiving a location request the location application, firstly the Telecommunication InterFace (TIF) 102 examines the requesting parameters. Based on Accuracy and RequestedLocationMethod, the TIF 102 decides if Assisted GPS (AGPS) method (Method 7) should be used. Note that the ResponseTime and the request Type are taken into account for the decision as well, e.g. if NO-DELAY is required then the Assisted GPS (AGPS) method is not possible. If the AGPS method is not possible, or the request asks for a non-AGPS method, e.g. if RequestLocationMethod=Network, then the Telecommunication InterFace (TIF) 102 queries the internal database 403 to see if location information of the target subscriber is cached in the database 403. Note that the location information of a certain subscriber includes the serving Mobile Switch Center (MSC)/Serving GPRS Support Node (SGSN) number, and supported Mobile Application Part (MAP) version etc. Based on the MAP version and other request parameters, the Telecommunication InterFace (TIF) 102 will decide which method should be used for the request.

If there is no location information record of target User Equipment, Telecommunication InterFace (TIF) 102 will trigger Method 6 to retrieve the serving Mobile Switch Center (MSC)/Serving GPRS Support Node (SGSN) information, and assume the serving Mobile Switch Center (MSC)/Serving GPRS Support Node (SGSN) supports Release 99 Mobile Application Part (MAP) version.

Upon a failure of a certain selected method, the Telecommunication InterFace (TIF) 102 will try a different method as long as the timer for this location request transaction has not yet expired, or until a user_specified number of retries have been executed, or until no more reasonable retries remain.

FIG. 4 shows a strategy for selecting an alternate scheme for a retry, in accordance with the principles of the present invention.

In particular, as shown in FIG. 4, if the original method employed in step 300 is method 5, then successive attempts may employ, e.g., method 6 in step 310, method 1 in step 320, and method 7 in step 330. If the original method is method 1 in step 340, successive attempts may employ method 2 in step 350 and method 8 in step 360. If the original method is method 3 in step 370, successive attempts may employ method 4 in step 380 and method 7 in step 390.

Method 0

Figure 5:
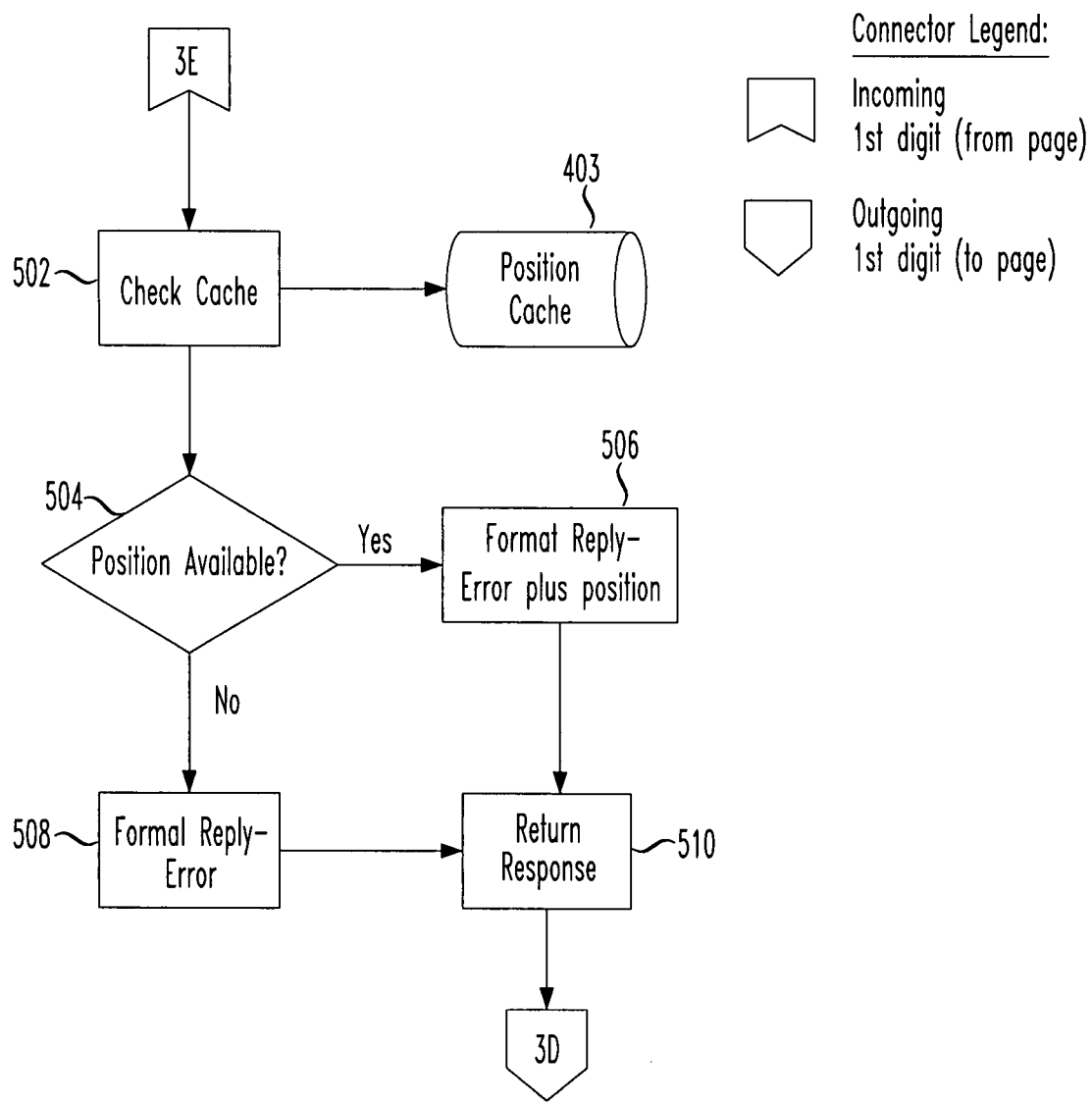
FIG. 5 shows exemplary scheme selection method 0 wherein a requested position is not obtainable, in accordance with the principles of the present invention.

FIG. 5 shows exemplary scheme selection method 0 wherein a requested position is not obtainable, in accordance with the principles of the present invention.

In particular, FIG. 5 shows the detailed procedure of method 0. Method 0 is used in the case that the requested position is not obtainable.

In step 502 the position cache database 403 is checked and in step 504 it is determined whether a position is available. If a position is available, then in step 506 a reply is formatted including an error plus a position and in step 510 a response is returned. If no position is available, then in step 508 a reply is formatted including only an error signal, and in step 510 the response is returned.

Method 1

Figure 6:
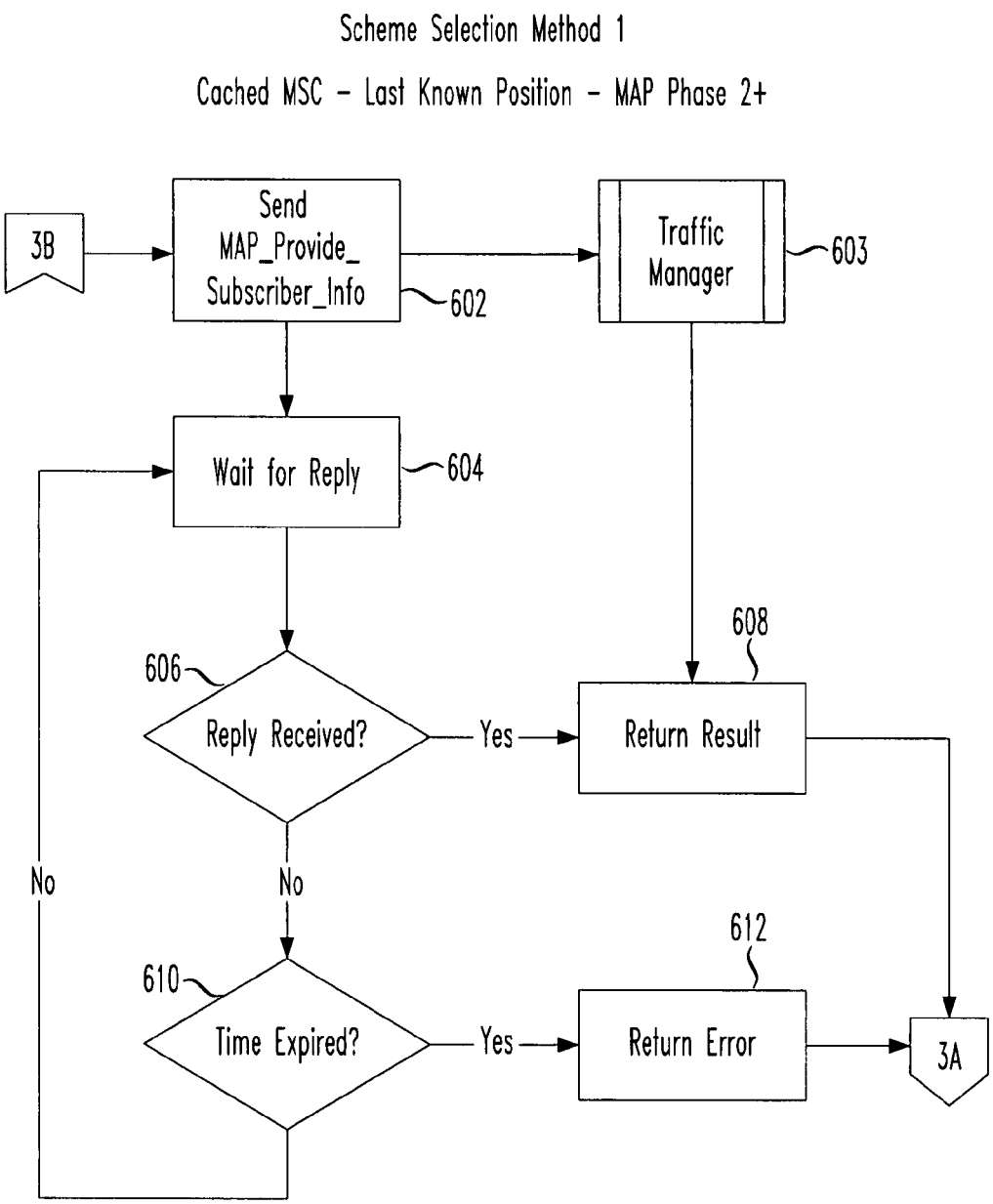
FIG. 6 shows exemplary scheme selection method 1 wherein a Telecommunication InterFace (TIF) determines that position information was previously cached, in accordance with the principles of the present invention.

FIG. 6 shows exemplary scheme selection method 1 wherein the Telecommunication InterFace (TIF) 102 determines that the position information was previously cached, in accordance with the principles of the present invention.

In particular, FIG. 6 shows the detailed procedure of method 1, which is used in the case that the Telecommunication InterFace (TIF) 102 determinates that the position information was cached before, and the serving Mobile Switch Center (MSC)/Serving GPRS Support Node (SGSN) supports the Mobile Application Part (MAP) version defined for Phase 2+.

In step 602 a signal MAP_Provide_Subscriber_Info is sent to a Traffic Manager 603, and in step 604 the TIF 102 waits for a reply. In step 606 it is determined whether a reply has been received by TIF 102, and if a reply has been received a result is returned in step 608. If no reply has been received, it is determined in step 610 whether the timer has expired, and if the timer has expired, then an error is returned in step 612. If the timer has not expired, then the method returns to step 604.

Method 2

Figure 7:
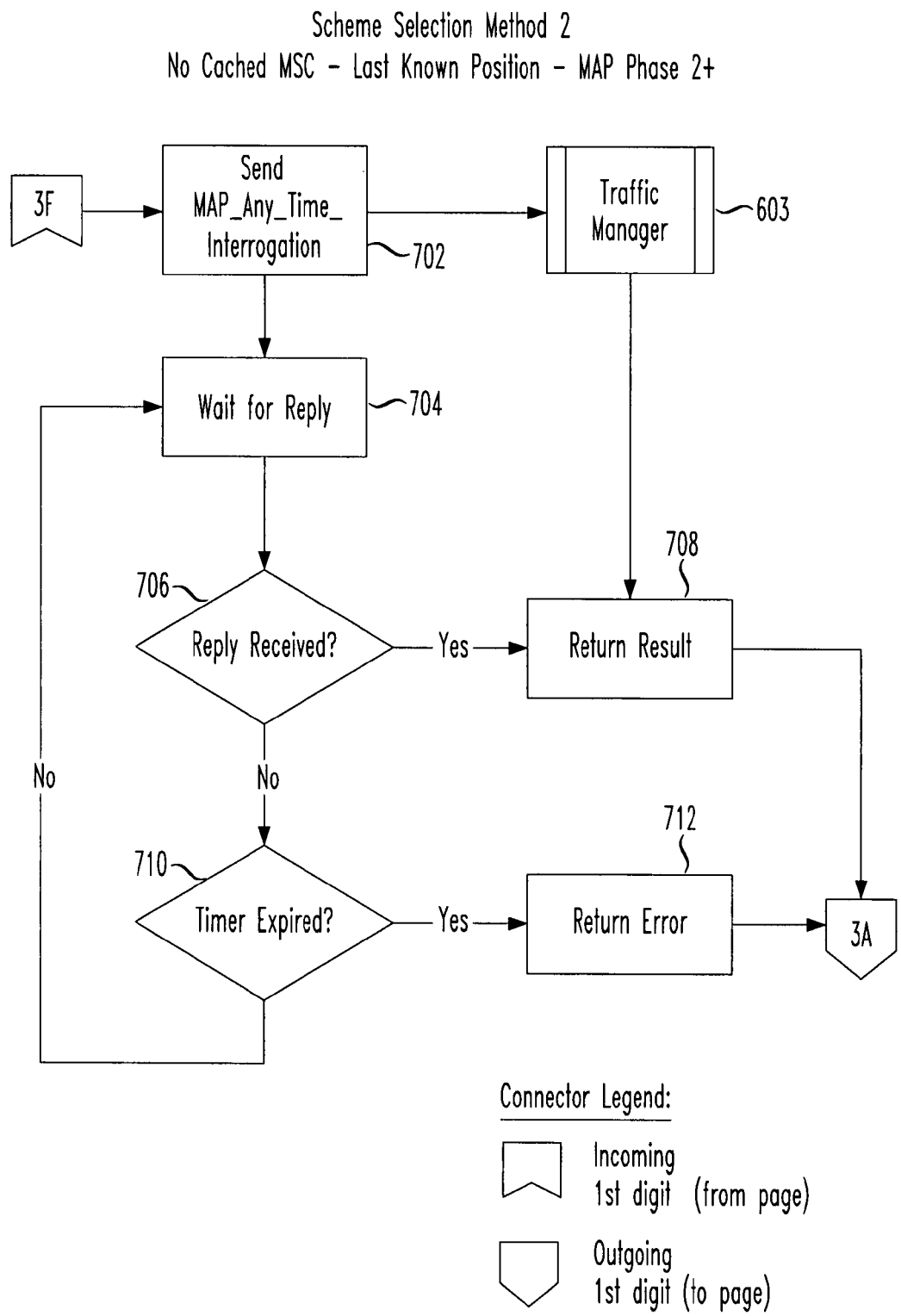
FIG. 7 shows exemplary scheme selection method 2 wherein position information of the target user equipment is not available, in accordance with the principles of the present invention.

FIG. 7 shows exemplary scheme selection method 2 wherein the position information of the target User Equipment is not available, in accordance with the principles of the present invention.

In particular, FIG. 7 shows the details of method 2, which is used in the case that the position information of the target User Equipment is not available, hence no information regarding the serving Mobile Switch Center (MSC)/Serving GPRS Support Node (SGSN) is available, and the request Type is LAST KNOWN.

In step 702 a MAP_Any_Time_Interrogation signal is sent by the TIF 102 to the Traffic Manager 603, and in step 704 the TIF 102 waits for a reply. In step 706 it is determined whether a reply has been received, and if a reply has been received, then a result is returned in step 708. If a reply has not been received, then in step 710 it is determined whether the timer has expired, and if the timer has expired, then an error is returned in step 712. If the timer has not expired, then the method returns to step 704.

Method 3

Figure 8:
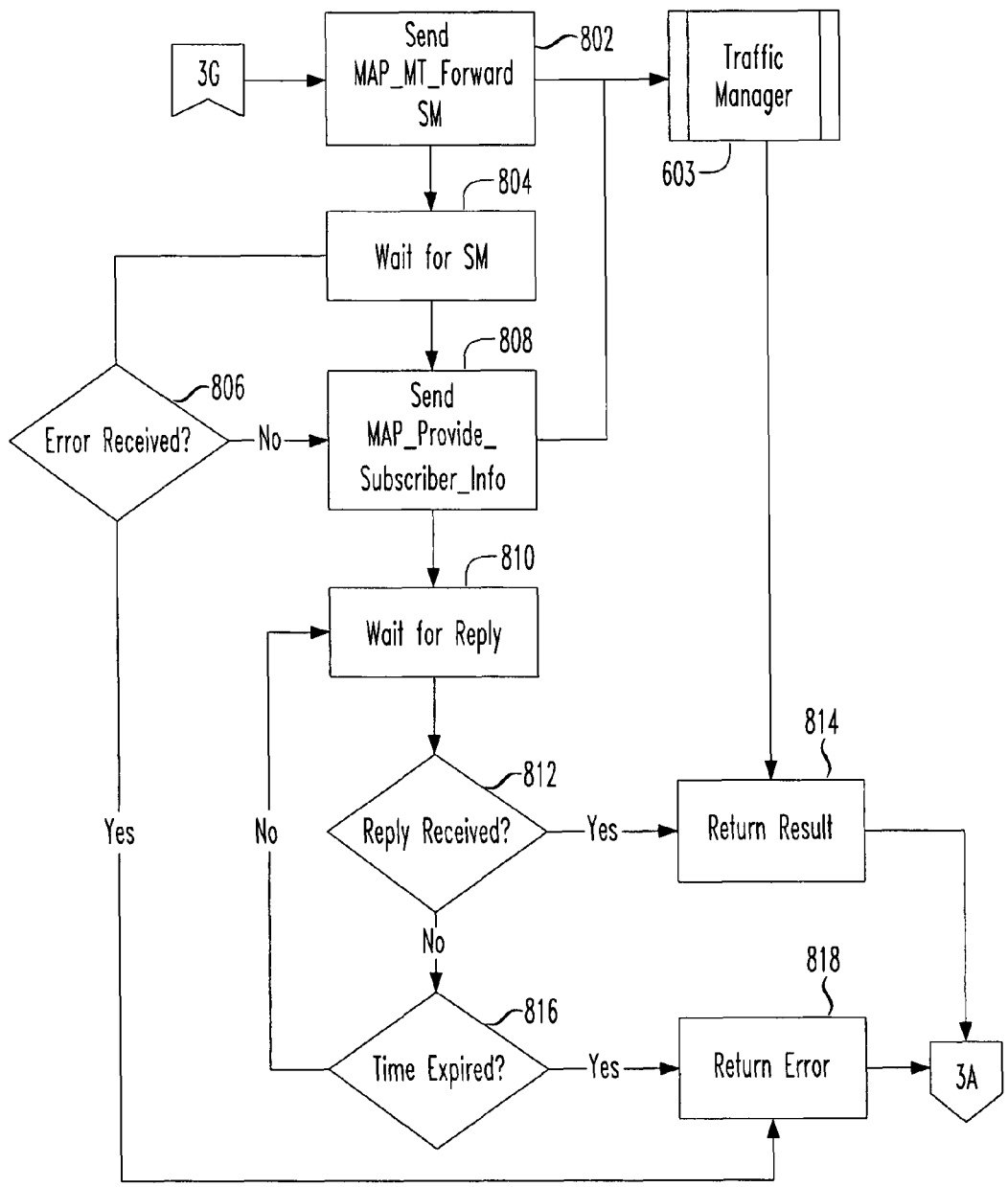
FIG. 8 shows exemplary scheme selection method 3 wherein position information of a target user equipment is available from a cache database, in accordance with the principles of the present invention.

FIG. 8 shows exemplary scheme selection method 3 wherein the position information of the target User Equipment is available from a cache database 403, in accordance with the principles of the present invention.

In particular, FIG. 8 shows the embodiment of method 3, which is used in the case that the position information of the target User Equipment is available from the cache database 403, which indicates the serving Mobile Switch Center (MSC)/Serving GPRS Support Node (SGSN) supports Mobile Application Part (MAP) version for Phase 2+, and the request type is CURRENT.

In step 802, a MAP_MT_ForwardShort Message is sent by the TIF 102 to the Traffic Manager 603, and in step 804 the TIF 102 waits for a Short Message. In step 806 it is determined whether an error has been received, and if an error has been received the method jumps to step 818 to return an error. If no error has been received, then in step 808 a MAP_Provide_Subscriber_Info signal is sent, and in step 810 the TIF 102 waits for a reply. In step 812 it is determined whether a reply has been received, and if a reply has been received, then a result is returned in step 814. If no reply has been received, then in step 816 it is determined whether the timer has expired, and if the timer has expired, then in step 818 an error is returned. If the timer has not expired, then the method returns to step 810.

Method 4

Figure 9:
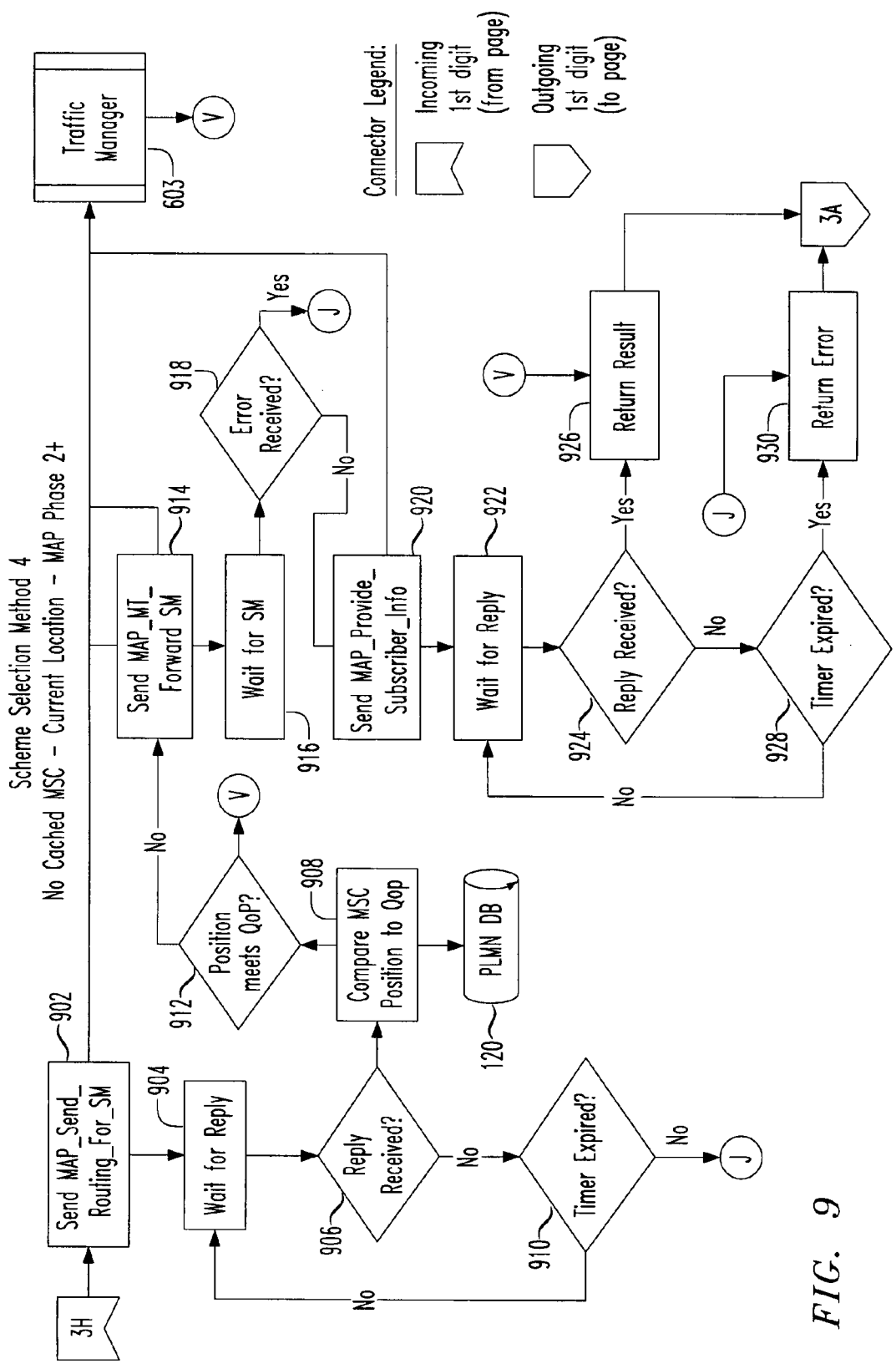
FIG. 9 shows exemplary scheme selection method 4 wherein no cached position information regarding a target user equipment is available, in accordance with the principles of the present invention.

FIG. 9 shows exemplary scheme selection method 4 wherein no cached position information regarding the target User Equipment is available, in accordance with the principles of the present invention.

In particular, FIG. 9 shows method 4, which is used in the case that no cached position information of the target User Equipment is available and the request Type is CURRENT. In this case, Telecommunication Interface (TIF) 102 queries the Home Location Register (HLR) for the serving Mobile Switch Center (MSC) using MAP_Send_Routing_Info_For_SM, and then sends a null short message to the target User Equipment to refresh it location information in the serving Mobile Switch Center (MSC)/Visitor Location Register (VLR).

If the Mobile Terminated (MT) short message delivery is successful, the Telecommunication InterFace (TIF) 102 then initiates MAP_Provide_Subscriber_Info to retrieve the location information of the target User Equipment.

In step 902, a MAP_Send_Routing_For_SM signal is sent by the TIF 102 to the Traffic Manager 603, and in step 904 the TIF 102 waits for a reply. In step 906 it is determined whether a reply has been received, and if a reply has been received, then the MSC position is compared to the Quality of Position (QoP) in step 908 from the PLMN database 120. If a reply has not been received, then it is determined whether the timer has expired in step 910, and if the timer has expired then an error is returned in step 930. If the timer has not expired, then the method returns to step 904. On completion of step 908, it is determined whether the position meets a desired Quality of Position (QoP) in step 912, and if the position meets the desired QoP, then a result is returned in step 926. If the position does not meet the desired QoP, then a MAP_MT_Forward Short Message is sent by the TIF 102 to the Traffic Manager 603 in step 914, and the TIF 102 waits for a reply in step 916. In step 918 it is determined whether an error has been received, and if an error has been received, then an error is returned in step 930. If an error has not been received, then a MAP_Provide_Subscriber_Info signal is sent by the TIF 102 in step 920, and the TIF 102 waits for a reply in step 922. In step 924 it is determined whether a reply has been received, and if a reply has been received, then in step 926 a result is returned. If no reply has been received, then in step 928 it is determined whether the timer has expired, If the timer has expired, then in step 930 an error is returned, and if the timer has not expired, then the method returns to step 922.

Method 5

Figure 10:
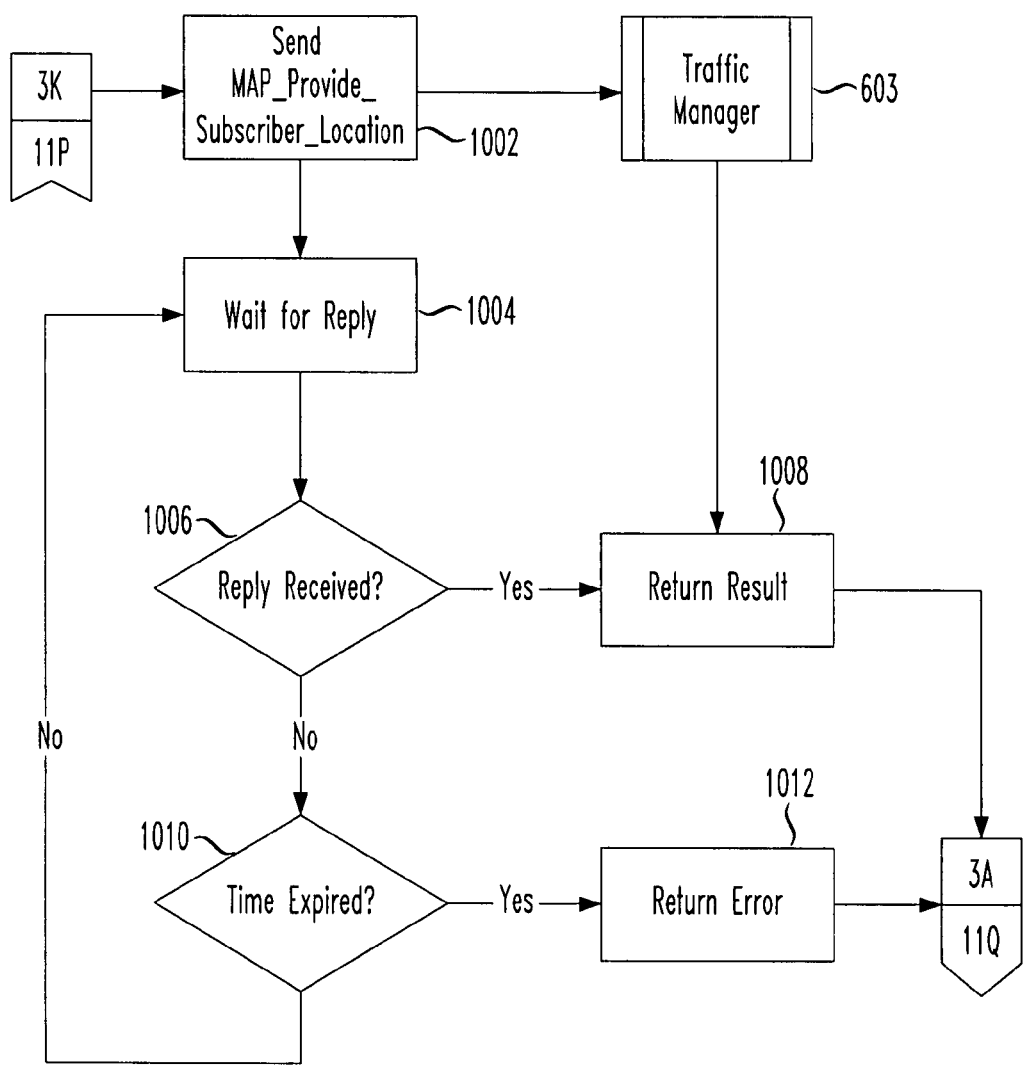
FIG. 10 shows exemplary scheme selection method 5 wherein position information is available in a cache database, in accordance with the principles of the present invention.

FIG. 10 shows exemplary scheme selection method 5 wherein position information is available in the cache database 403, in accordance with the principles of the present invention.

In particular, FIG. 10 shows the procedure details of method 5, which is used in the case that the position information is available in the cache database 403, indicating that the serving Mobile Switch Center (MSC)/Serving GPRS Support Node (SGSN) supports Release 99 Mobile Application Part (MAP) version.

In step 1002 a MAP_Provide_Subscriber_Location signal is sent by the TIF 102 to the Traffic Manager 603, and in step 1004 the TIF 102 waits for a reply. In step 1006 it is determined whether a reply has been received, and if a reply has been received, then in step 1008 a result is returned. If no reply has been received, then in step 1010 it is determined whether the timer has expired, and if the timer has expired, then in step 1012 an error is returned. If the timer has not expired, then the method returns to step 1004.

Method 6

Figure 11:
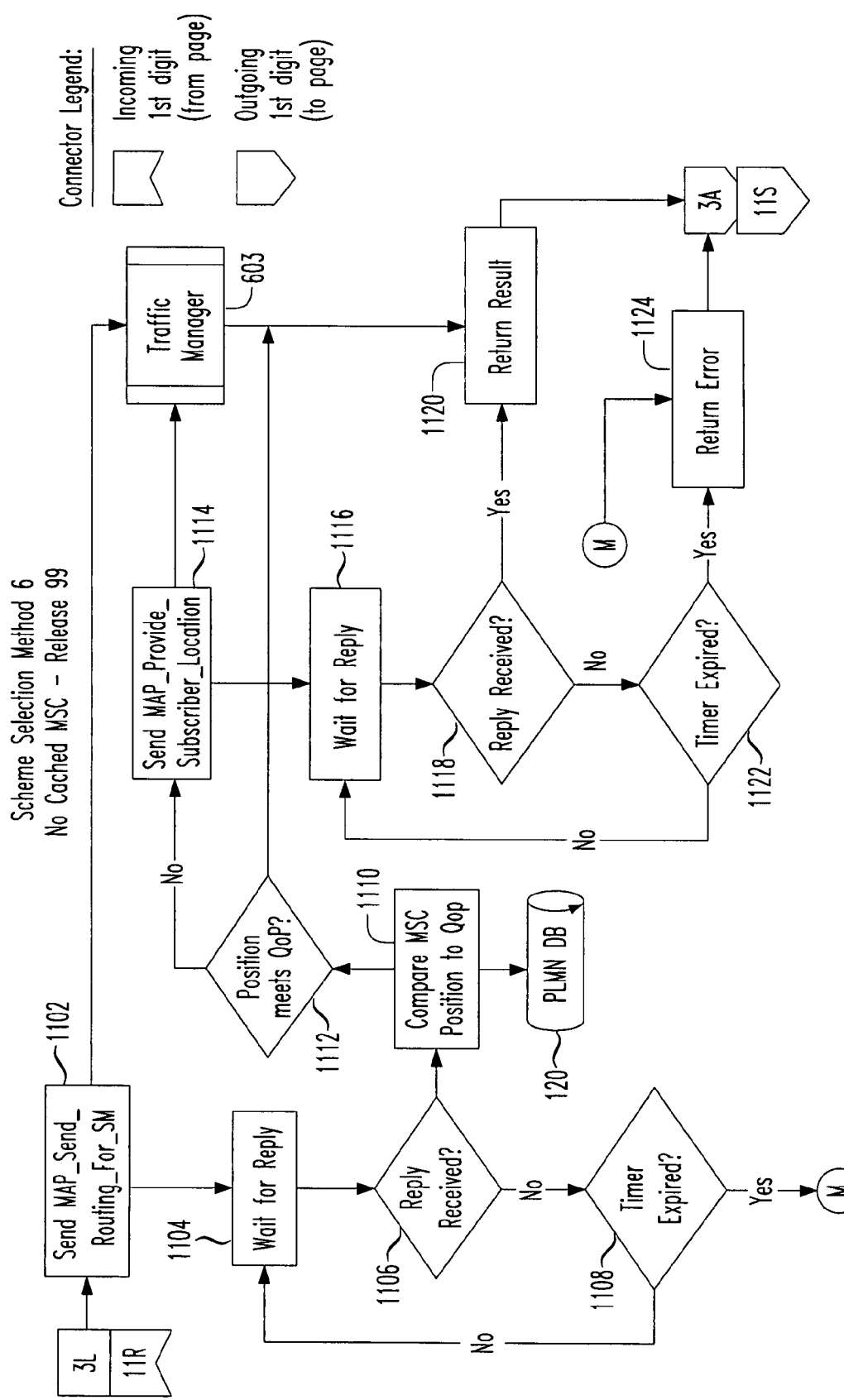
FIG. 11 shows exemplary scheme selection method 6 wherein no cached position information regarding a target subscriber is available, in accordance with the principles of the present invention.

FIG. 11 shows exemplary scheme selection method 6 wherein no cached position information regarding the target subscriber is available, in accordance with the principles of the present invention.

In particular, FIG. 11 shows method 6, which is used in the case that no cached position information of the target subscriber is available, the Telecommunication InterFace (TIF) 102 uses Release 99 Mobile Application Part (MAP) version to communicate with the various network components. Firstly the Telecommunication InterFace (TIF) 102 initiates MAP_Send_Routing_Info_For_LCS (LCS is short for LoCation Services) to retrieve the serving Mobile Switch Center (MSC)/Serving GPRS Support Node (SGSN)-number of the target User Equipment from the Home Location Register (HLR). If the original request asks for the location information higher than Mobile Switch Center (MSC)/Serving GPRS Support Node (SGSN) level, the Telecommunication InterFace (TIF) 102 uses MAP_Provide_Subscriber_Location to retrieve the location information of the target User Equipment from the Mobile Switch Center (MSC)/Serving GPRS Support Node (SGSN).

In step 1102 a MAP_Send_Routing_For_LCS signal is sent by the TIF 102 to the Traffic Manager 603, and in step 1104 the TIF 102 waits for a reply. It is determined in step 1106 whether a reply has been received, and if a reply has been received the method proceeds to step 1110. If no reply has been received, then in step 1108 it is determined whether the timer has expired, and if the timer has expired, then an error is returned in step 1124. If the timer has not expired, then the method returns to step 1104 In step 1110 the MSC position is compared to the desired Quality of Position (QoP), by means of the PLMN database 120, and in step 1112 it is determined whether the position meets the desired QoP. If the position meets the desired QoP, then a result is returned in step 1120, and if the position does not meet the desired QoP, then a Send_MAP_Provide_Subscriber_Location signal is sent in step 1114 and the TIF 102 waits for a reply in step 1116. In step 1118 it is determined whether a reply has been received, and if a reply has been received, then in step 1120 a result is returned. If a reply has not been received, then in step 1122 it is determined whether the timer has expired, and if the timer has expired, then in step 1124 an error is returned. If the timer has not expired, then the method returns to step 1116.

Method 7

Figure 12:
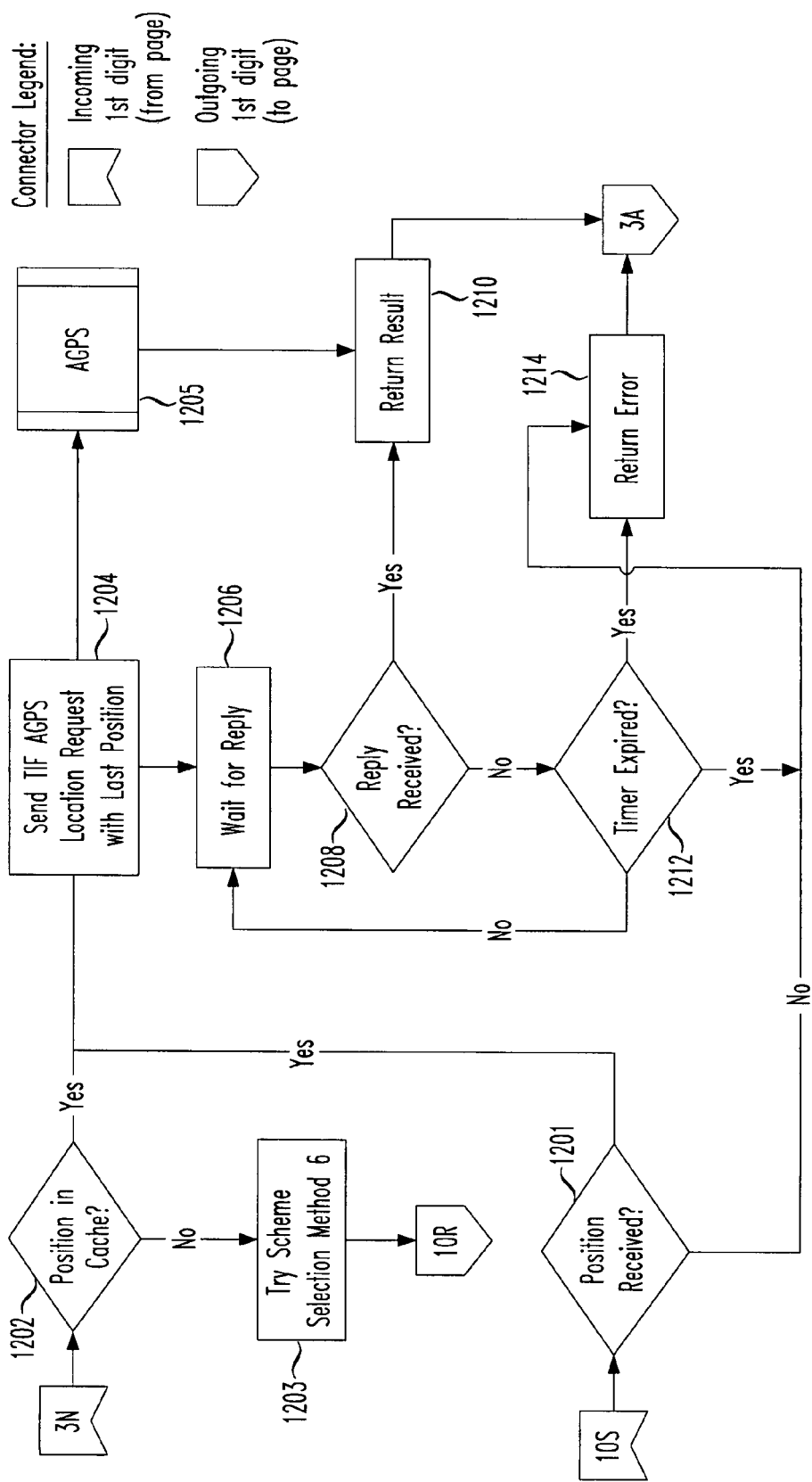
FIG. 12 shows exemplary scheme selection method 7 wherein an Assisted Global Positioning Satellite (AGPS) system mechanism is used to retrieve accurate position information regarding a target user equipment, in accordance with the principles of the present invention.

FIG. 12 shows exemplary scheme selection method 7 wherein an Assisted Global Positioning Satellite system (AGPS) mechanism is used to retrieve accurate position information regarding the target User Equipment, in accordance with the principles of the present invention.

In particular, FIG. 12 shows method 7, which uses Assisted GPS (AGPS) mechanism to retrieve the accurate position of the target User Equipment. In order to let the target User Equipment measure its position, the XLP needs to provide some assistance data to the target User Equipment. The assistance data is built upon the location information of the serving network element. Therefore, if no cached position information of the target User Equipment is available (or it is too old), the Telecommunication InterFace (TIF) 102 will initiate Method 6 to retrieve the necessary information from the core network.

In step 1202, it is determined whether the position is stored in cache 403, and if the position is not stored in cache 403, then the method exits in step 1203 and Scheme Selection Method 6 is tried (see FIG. 11). If the position is stored in cache 403, or if a position has been determined to have been received in step 1201, then in step 1204 a location request is sent with the last position to AGPS unit 1205, and in step 1206 the TIF 102 waits for a reply. In step 1208 it is determined whether a reply has been received, and if a reply has been received, then in step 1210 a result is returned. If a reply has not been received, then in step 1212 it is determined whether the timer has expired, and if the timer has expired, or if no position was received in step 1201, then in step 1214 an error is returned. If the timer has not expired, then the method returns to step 1206.

Method 8

Figure 13:
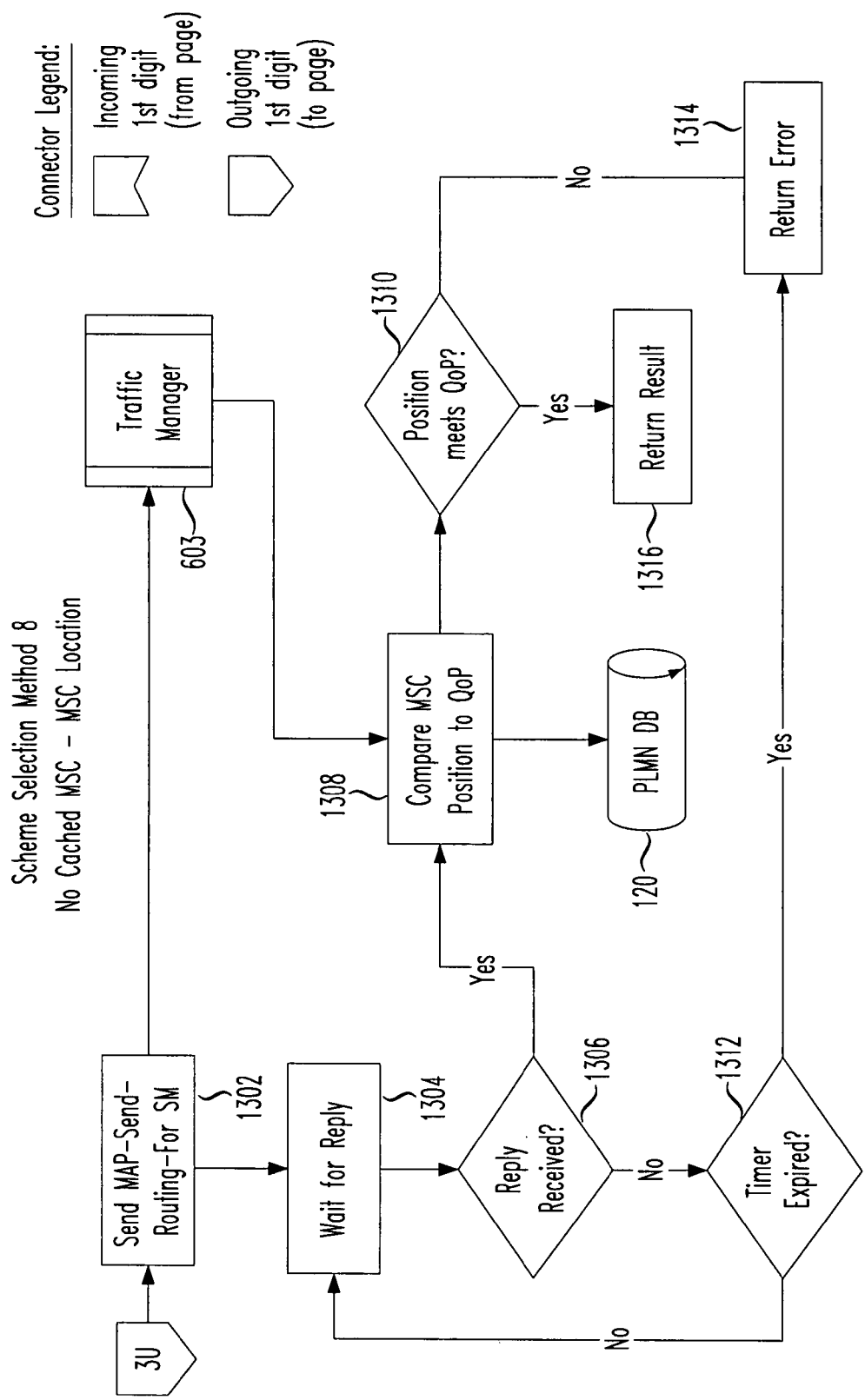
FIG. 13 shows exemplary scheme selection method 8 wherein cached position information is available, in accordance with the principles of the present invention.
Figure 16:
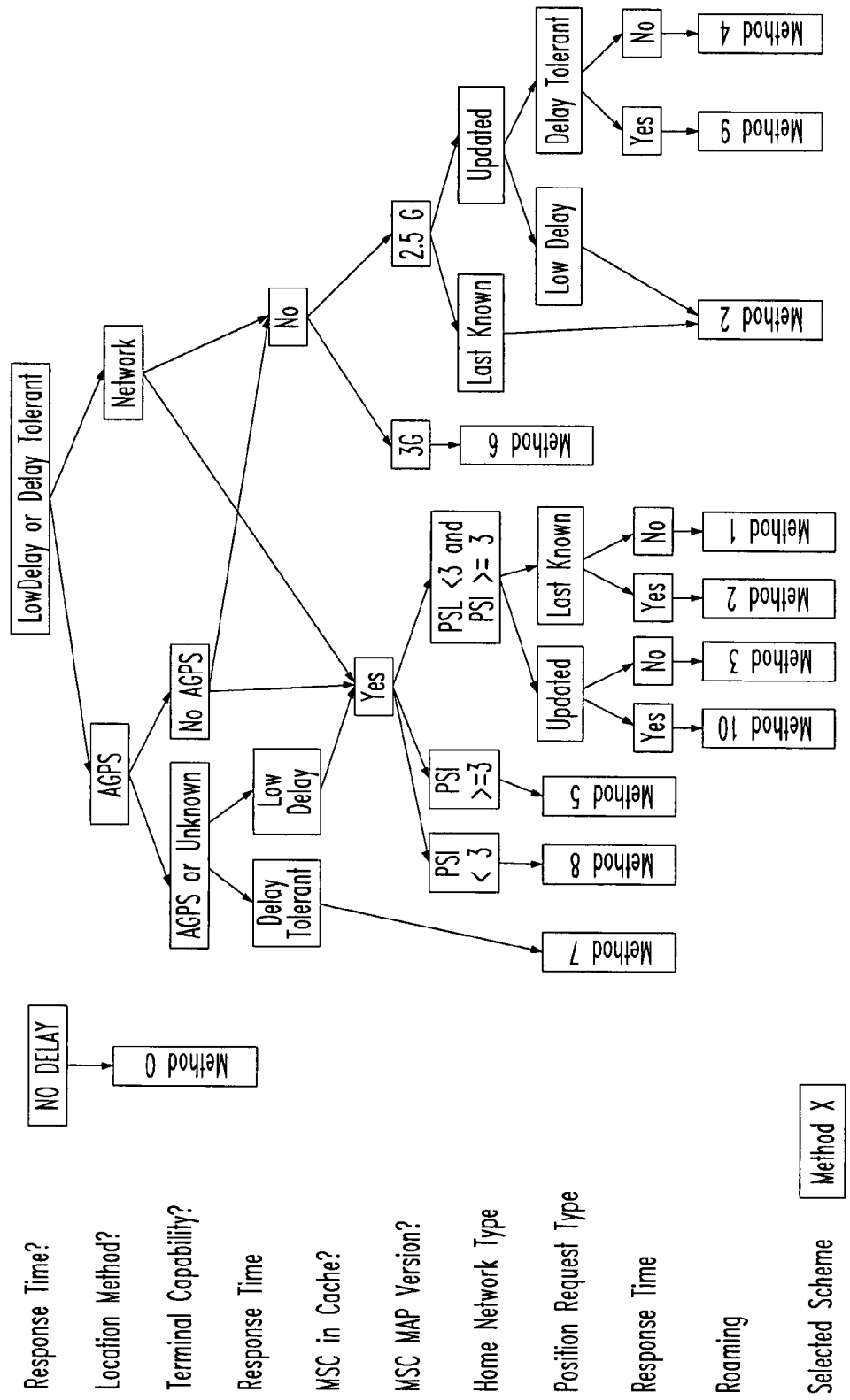
FIG. 16 shows a simplified scheme selection decision tree for the embodiment shown in FIG. 14.
Figure 17:
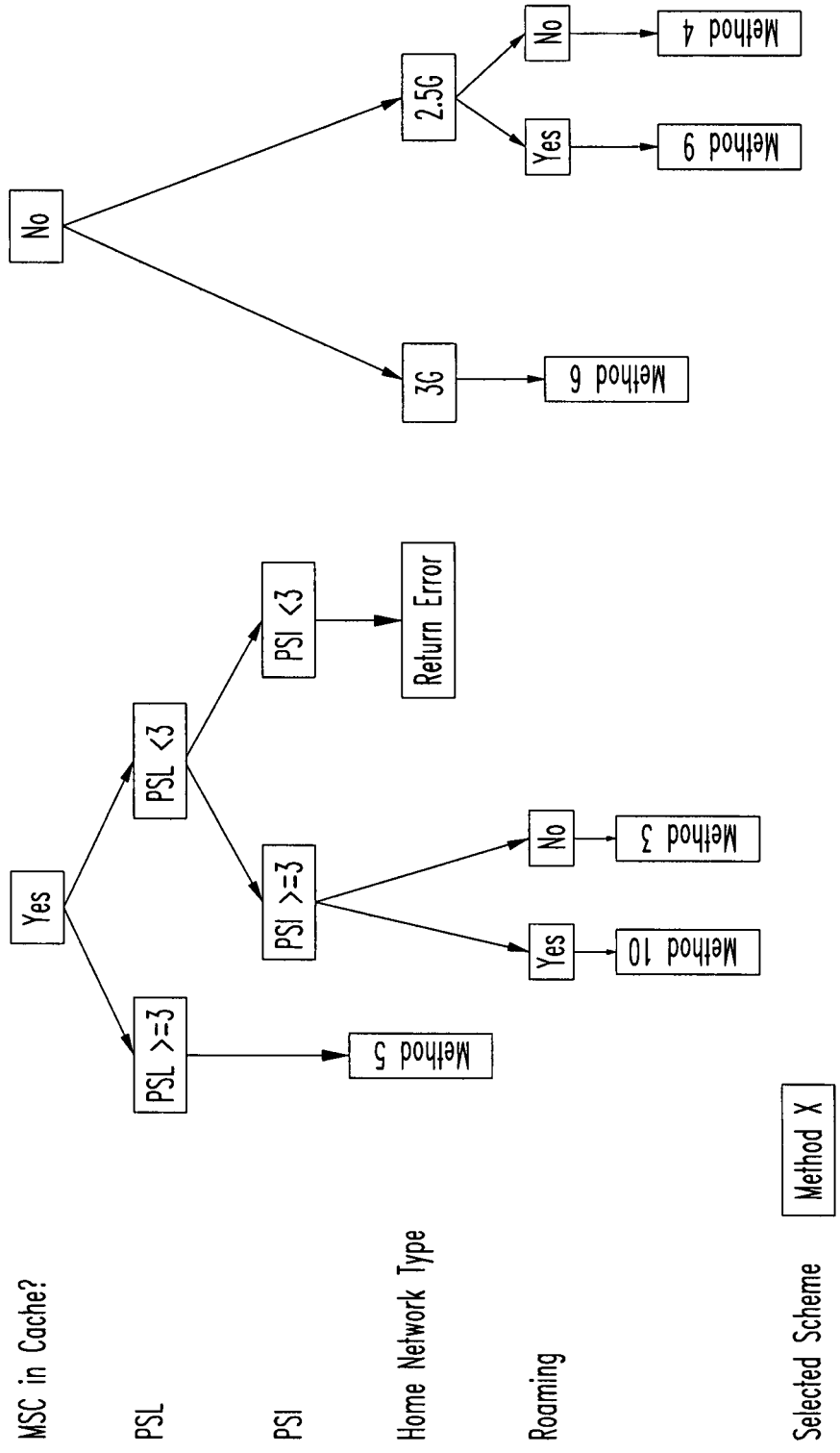
FIGS. 17 and 18 show an exemplary decision tree for handling an assisted GPS coarse position request.
Figure 18:
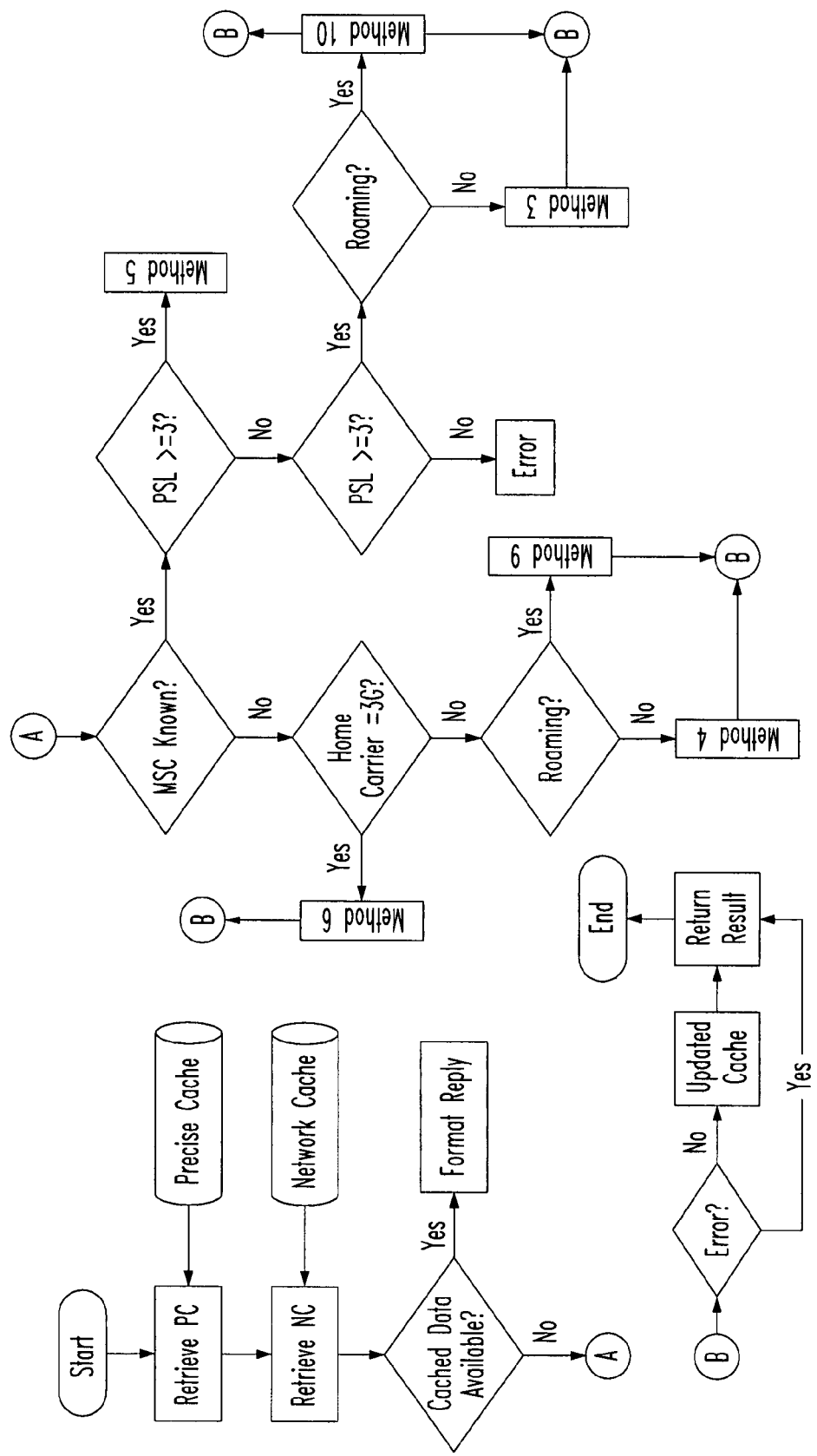
Figure 19:
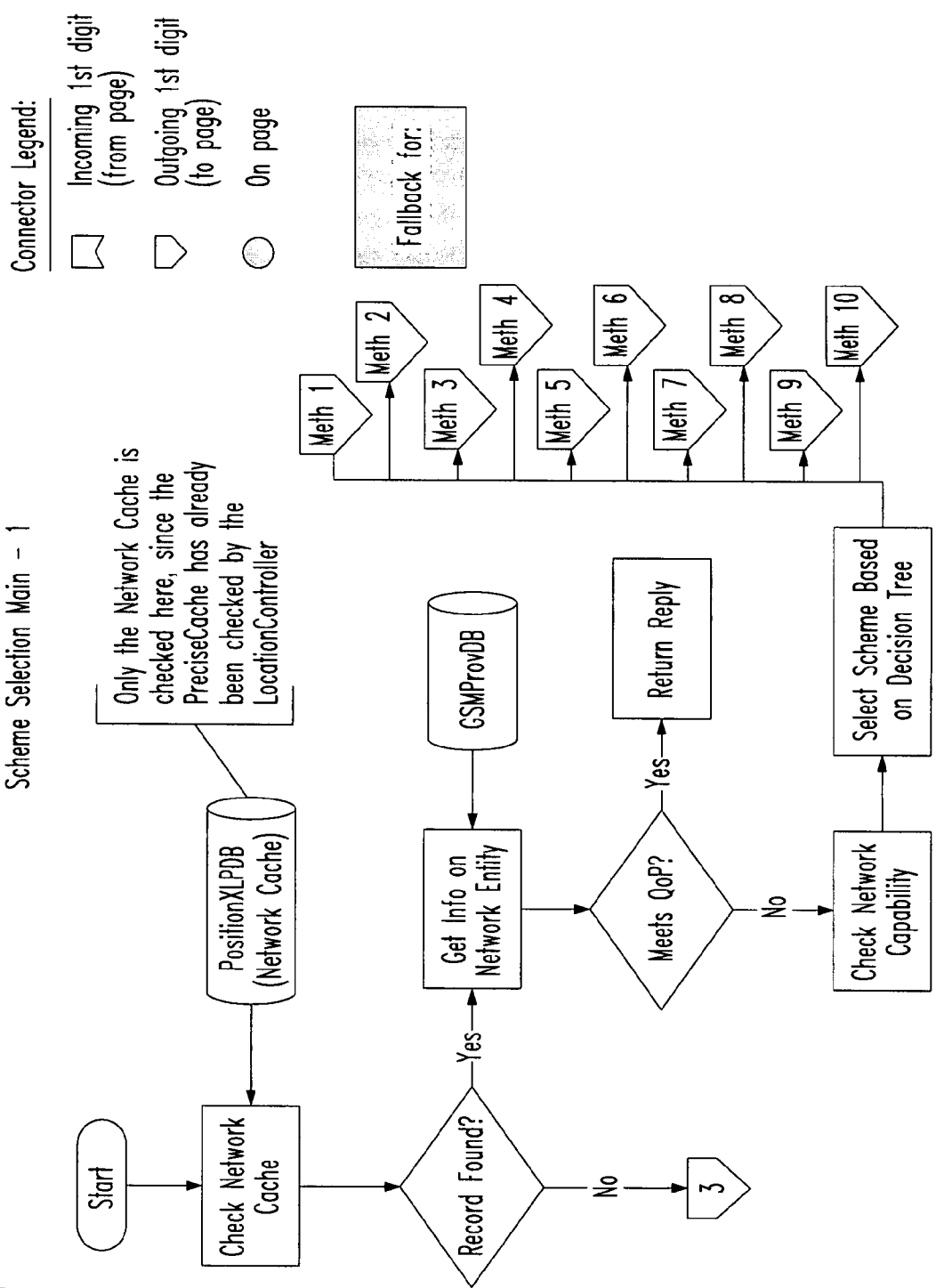
FIGS. 19-21 show an exemplary main scheme selection routine of the embodiment shown in FIG. 14.
Figure 20:
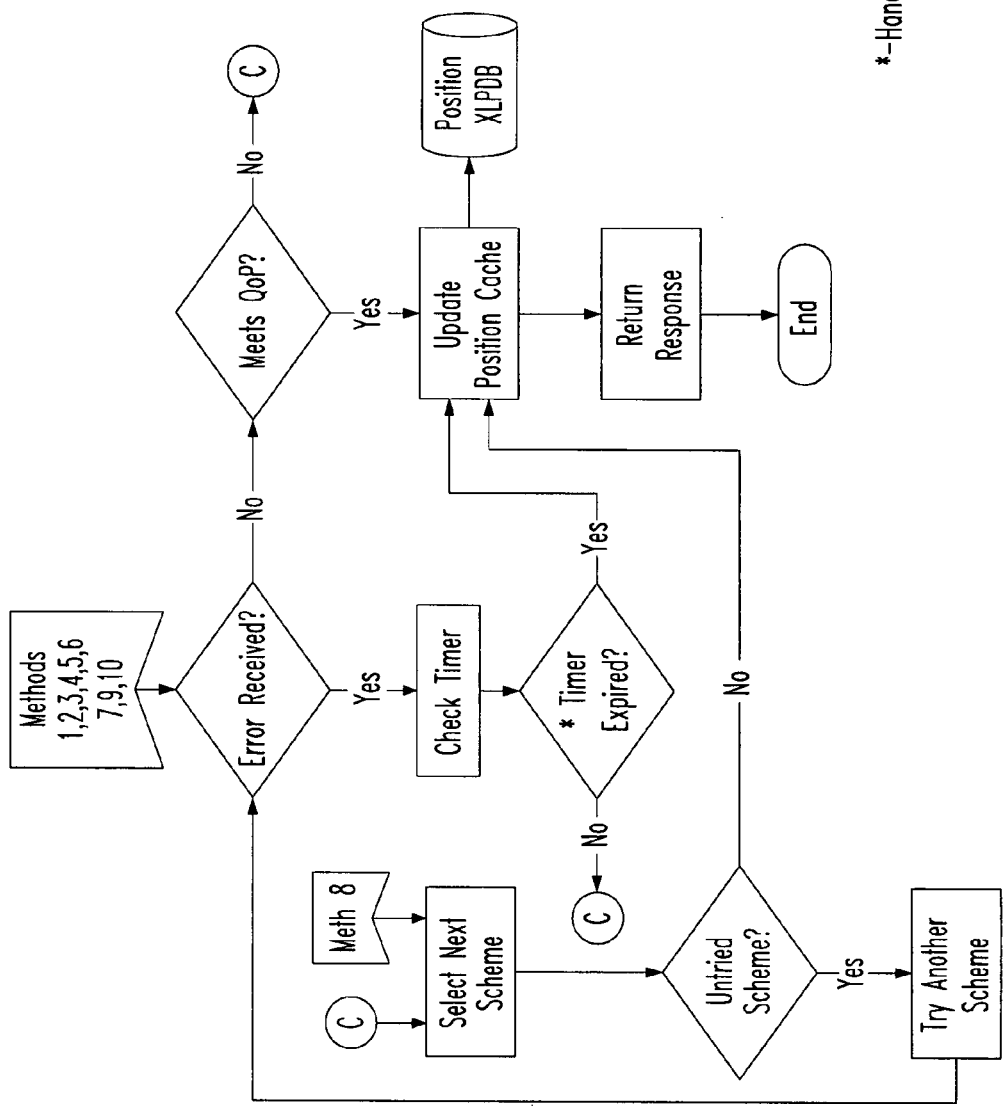
Figure 21:
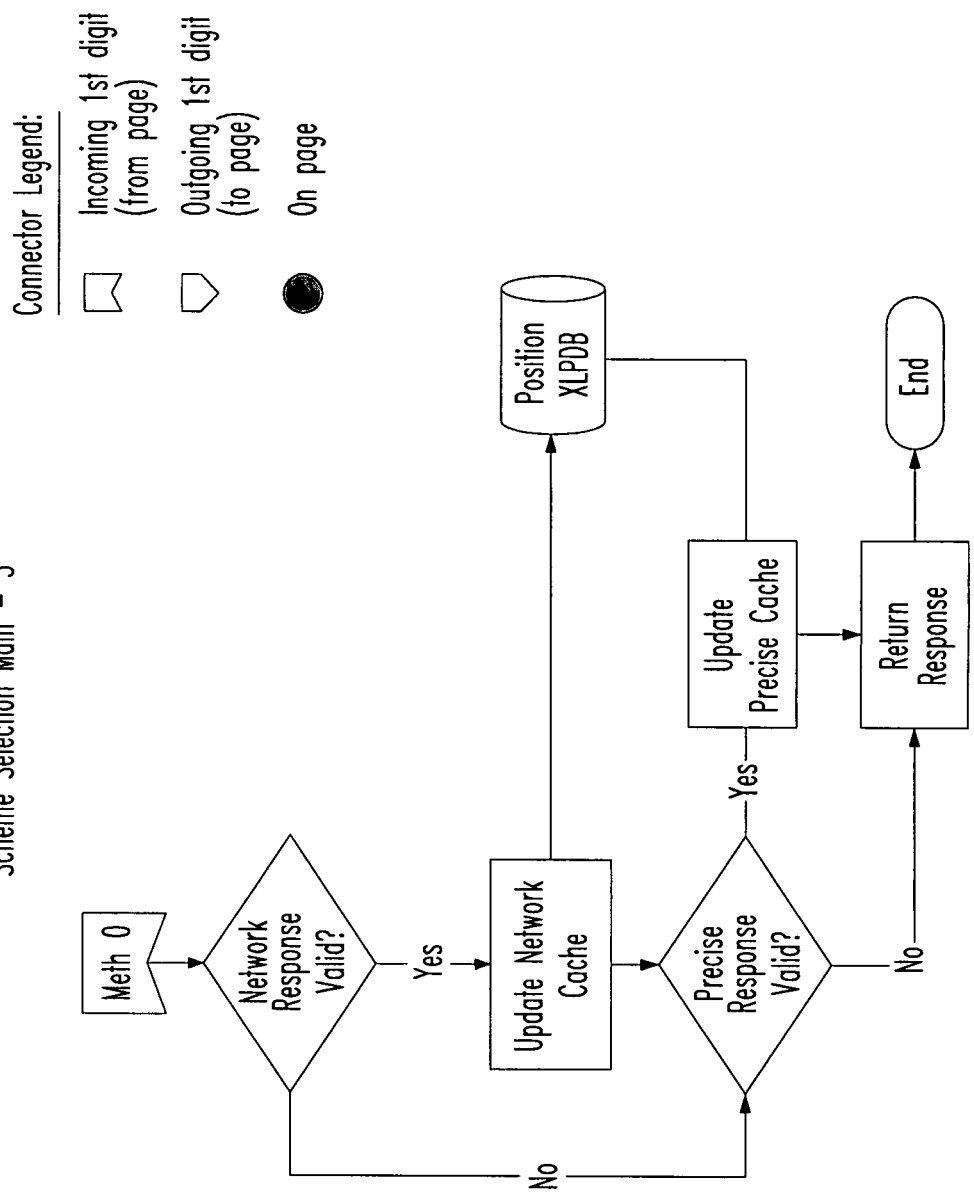
Figure 22:
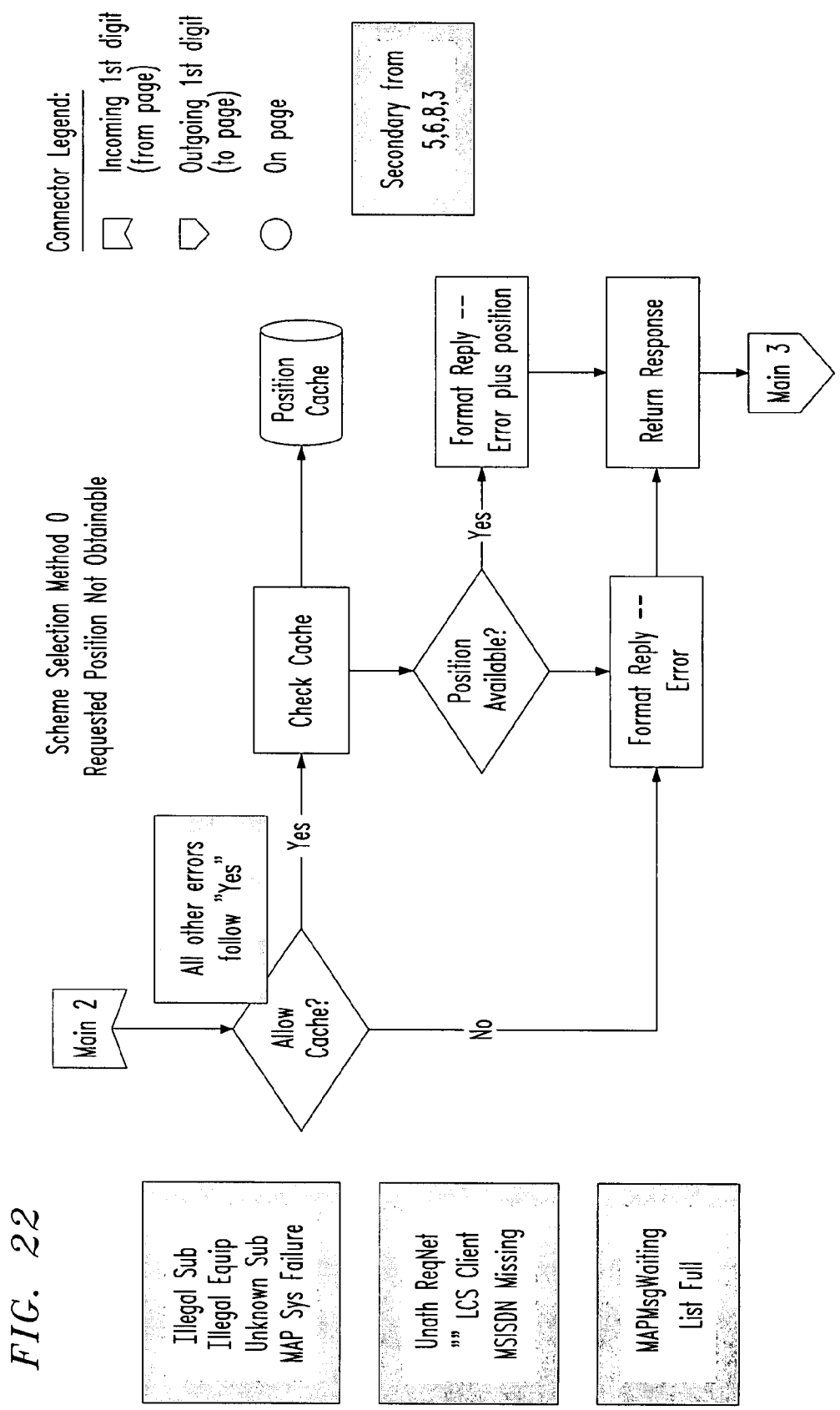
FIG. 22 shows an exemplary routine for method 0 of the scheme selection where the requested position is not obtainable.
Figure 23:
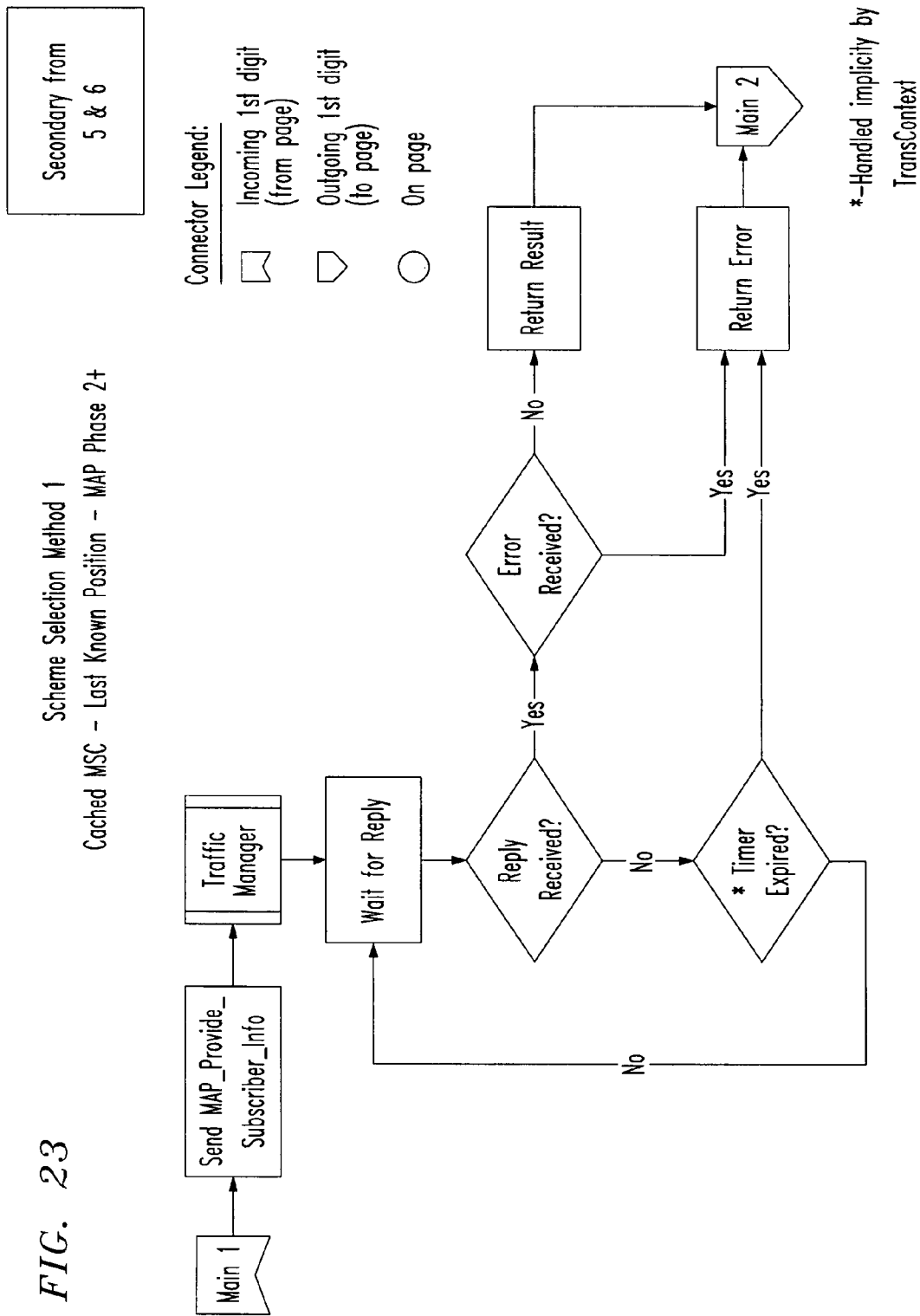
FIG. 23 shows an exemplary routine for method 1 of the scheme selection for cached MSC-last known position-MAP phase 2+.
Figure 24:
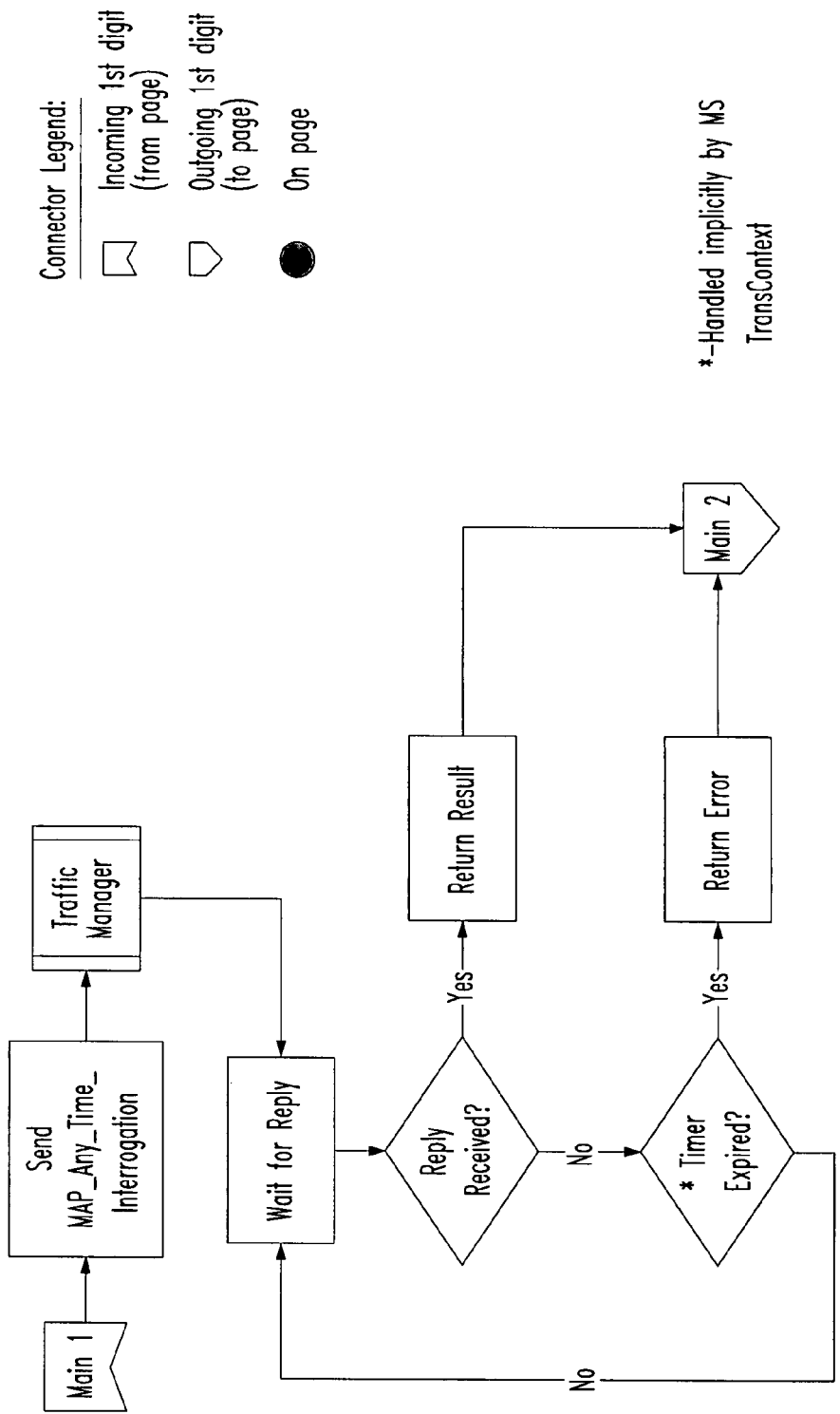
FIG. 24 shows an exemplary routine for method 2 of the scheme selection for no cached MSC-last known position-MAP phase 2+.
Figure 25:
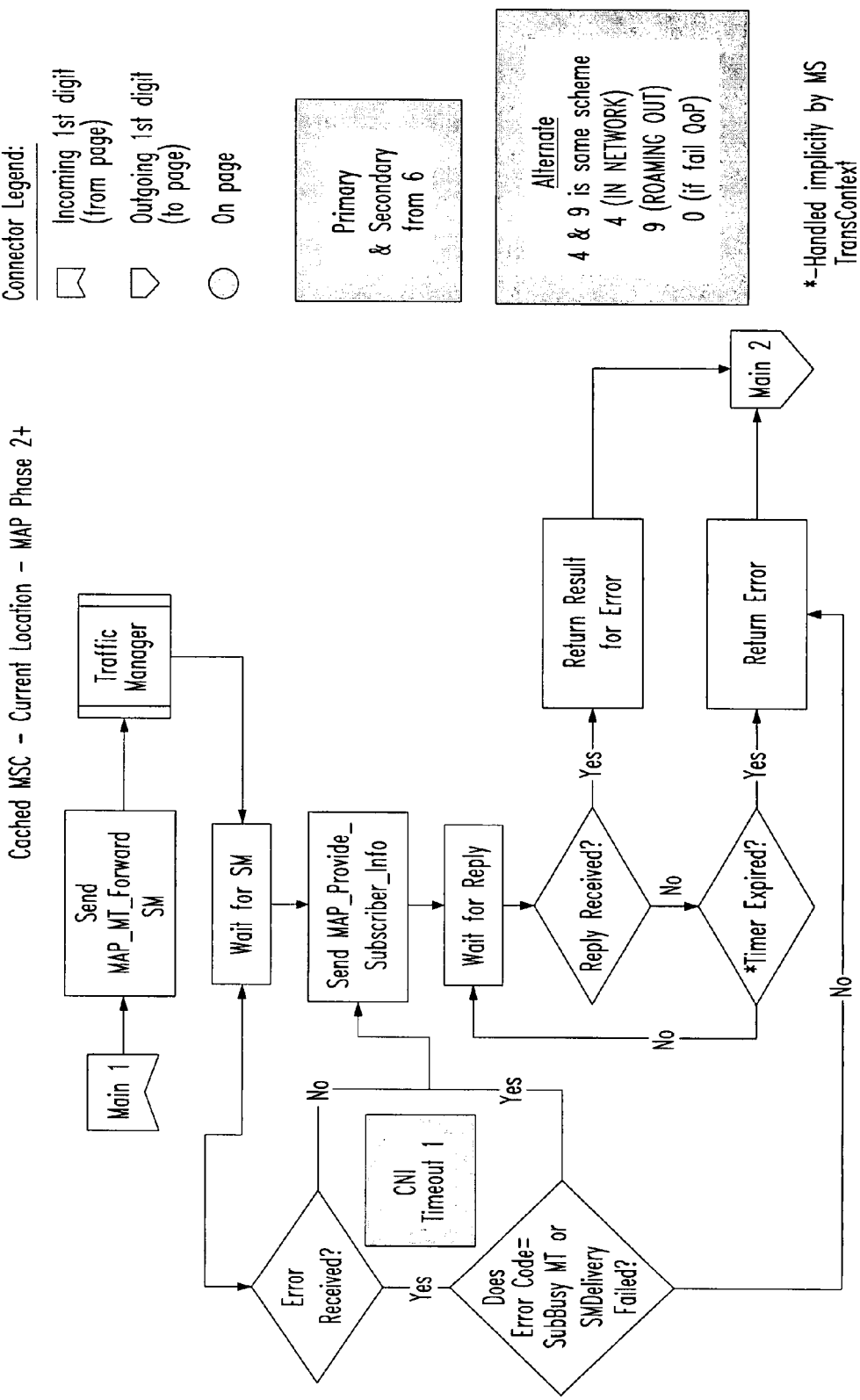
FIG. 25 shows an exemplary routine for method 3 of the scheme selection for cached MSC-current location-MAP phase 2+.
Figure 26:
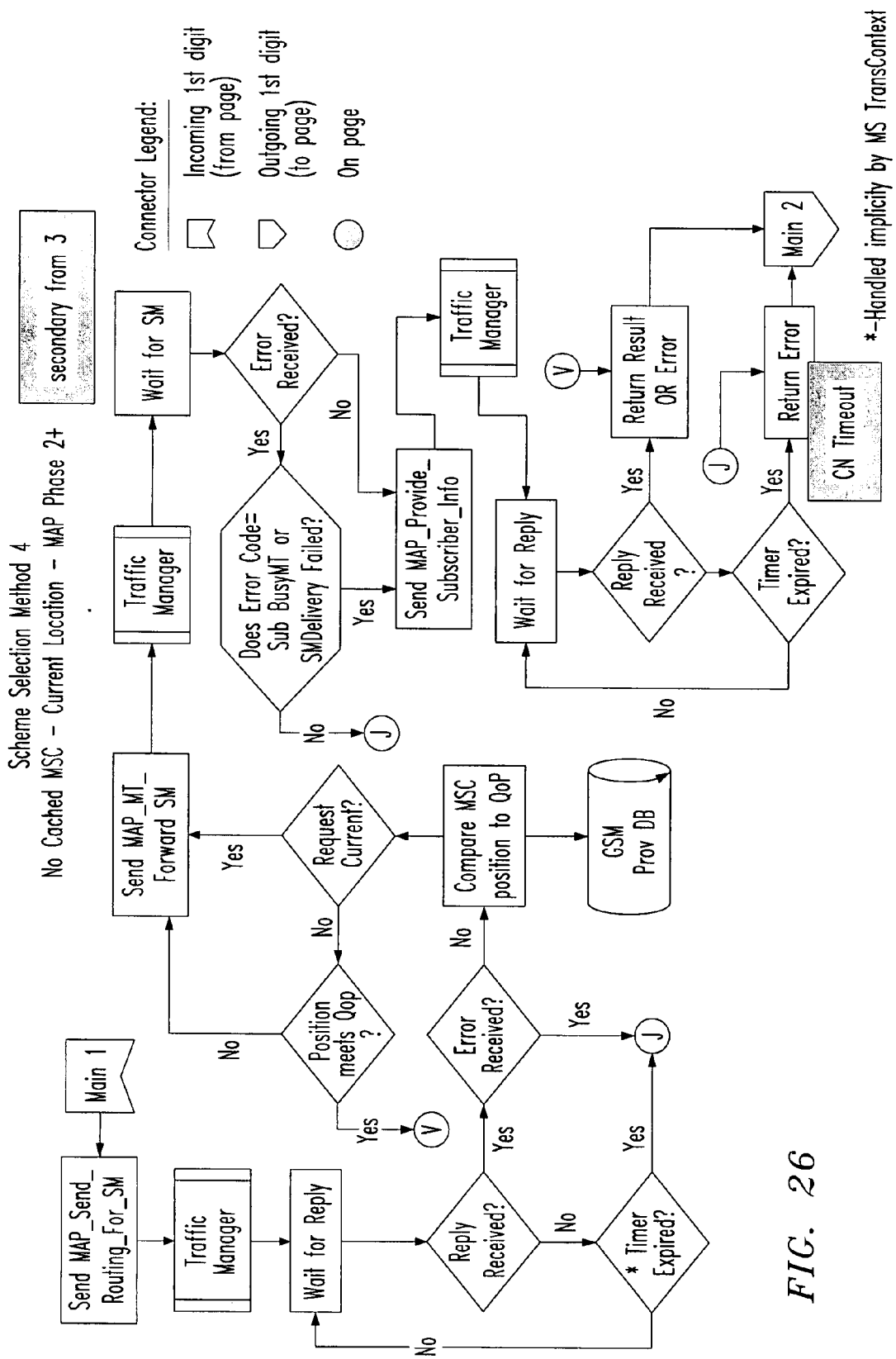
FIG. 26 shows an exemplary routine for method 4 of the scheme selection for no cached MSC-current location-MAP phase 2+.
Figure 27:
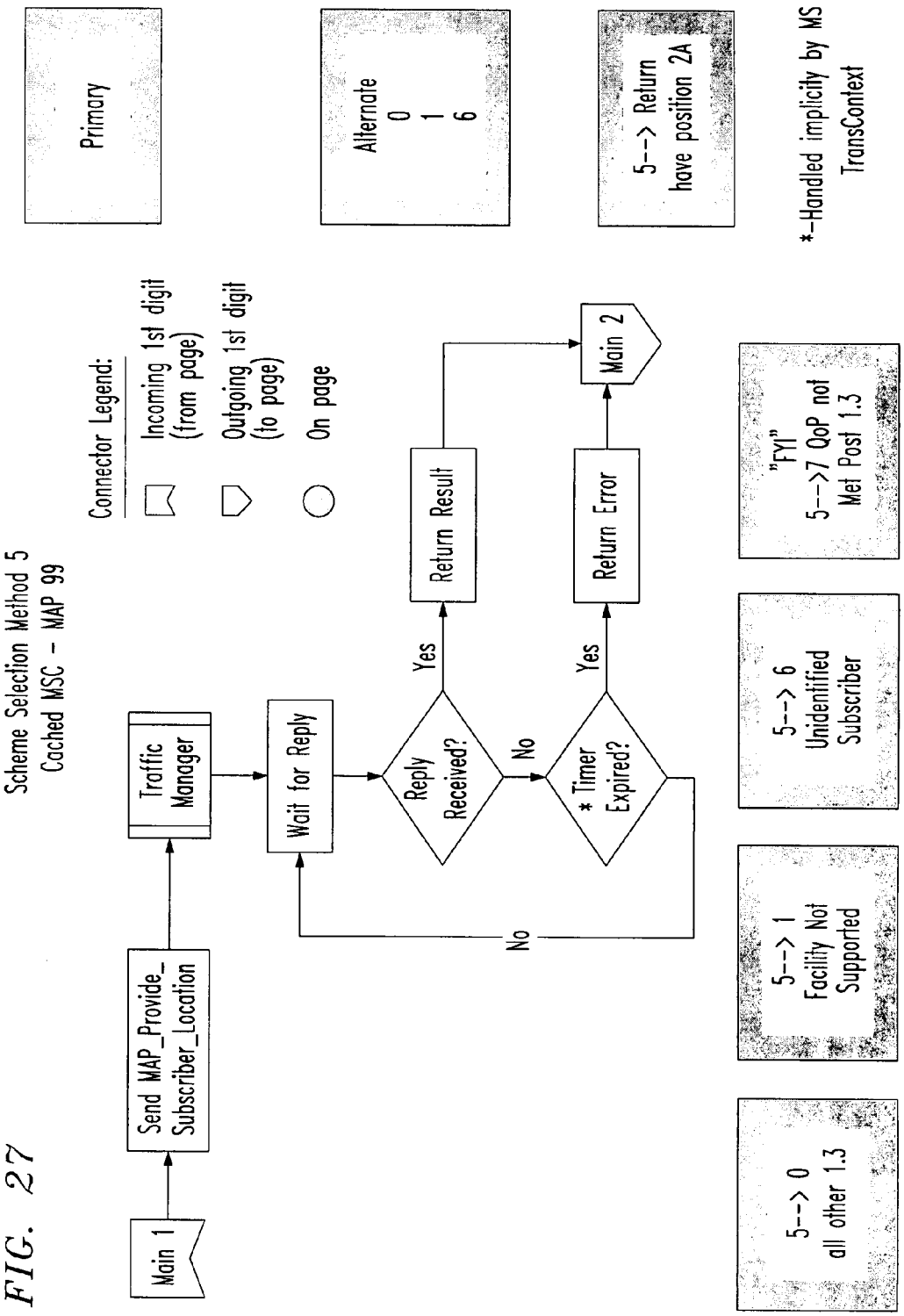
FIG. 27 shows an exemplary routine for method 5 of the scheme selection for no cached MSC-MAP 99.
Figure 28:
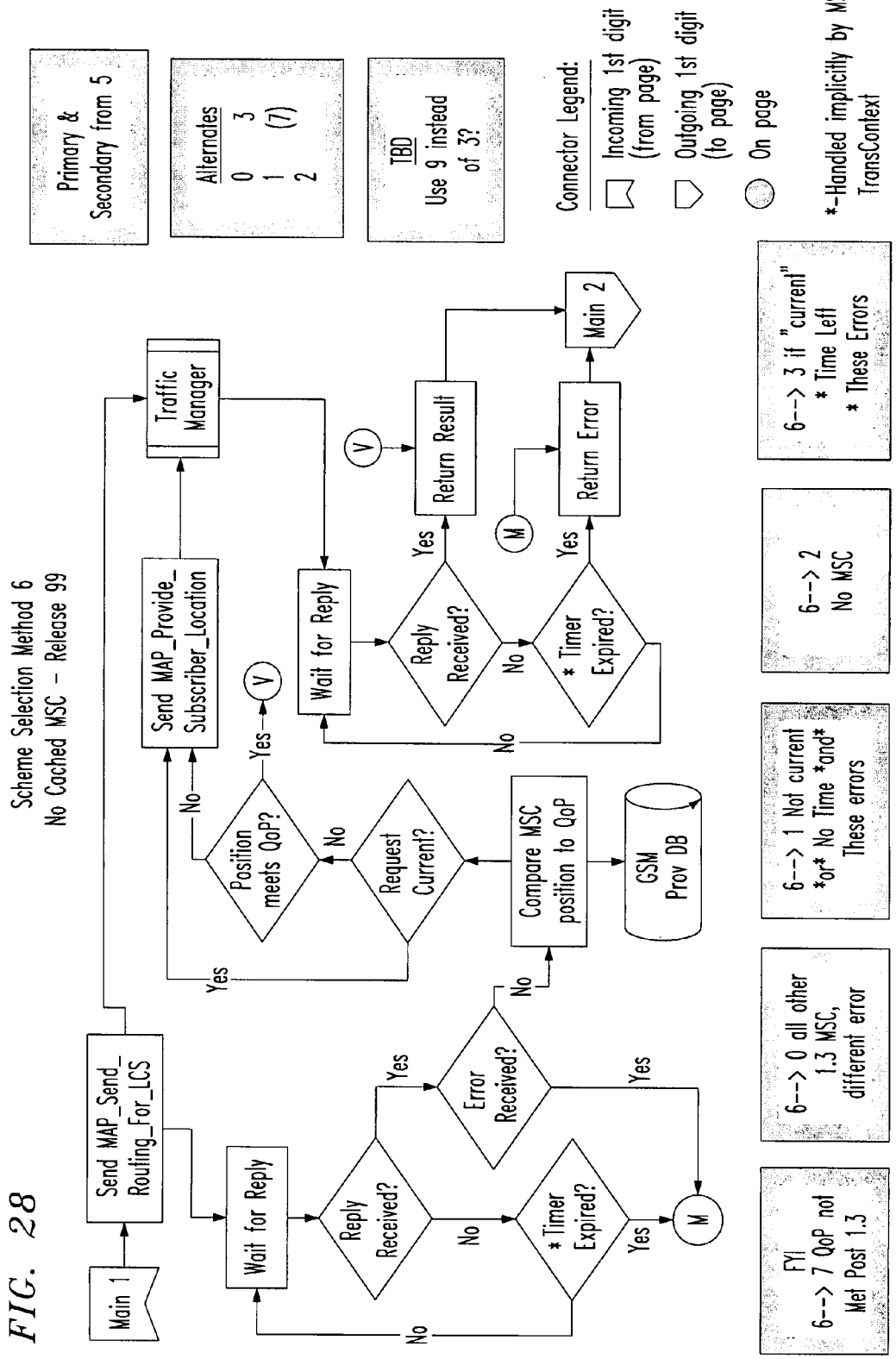
FIG. 28 shows an exemplary routine for method 6 of the scheme selection for no cached MSC-release 99.
Figure 29:
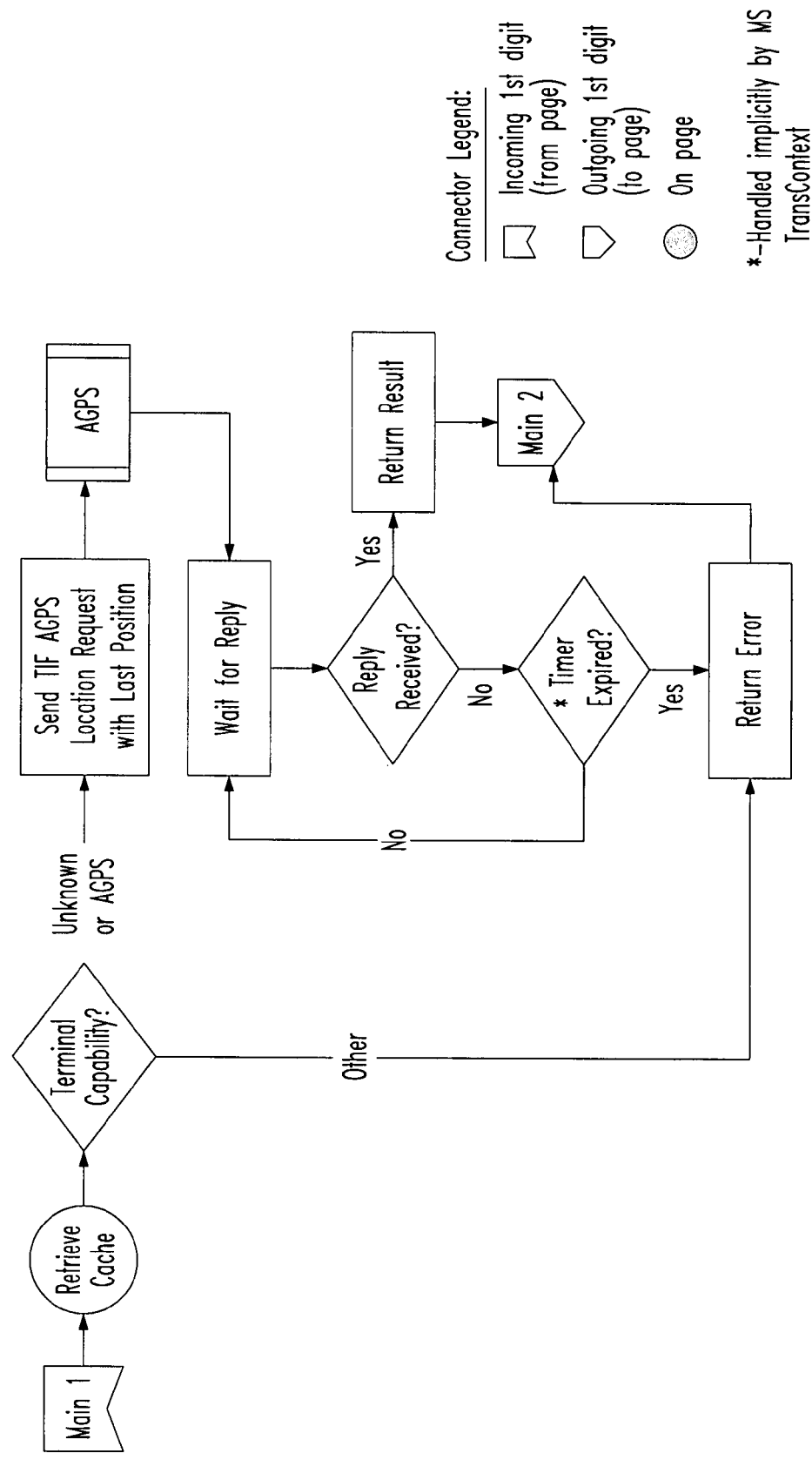
FIG. 29 shows an exemplary routine for method 7 of the scheme selection for assisted GPS location.
Figure 30:
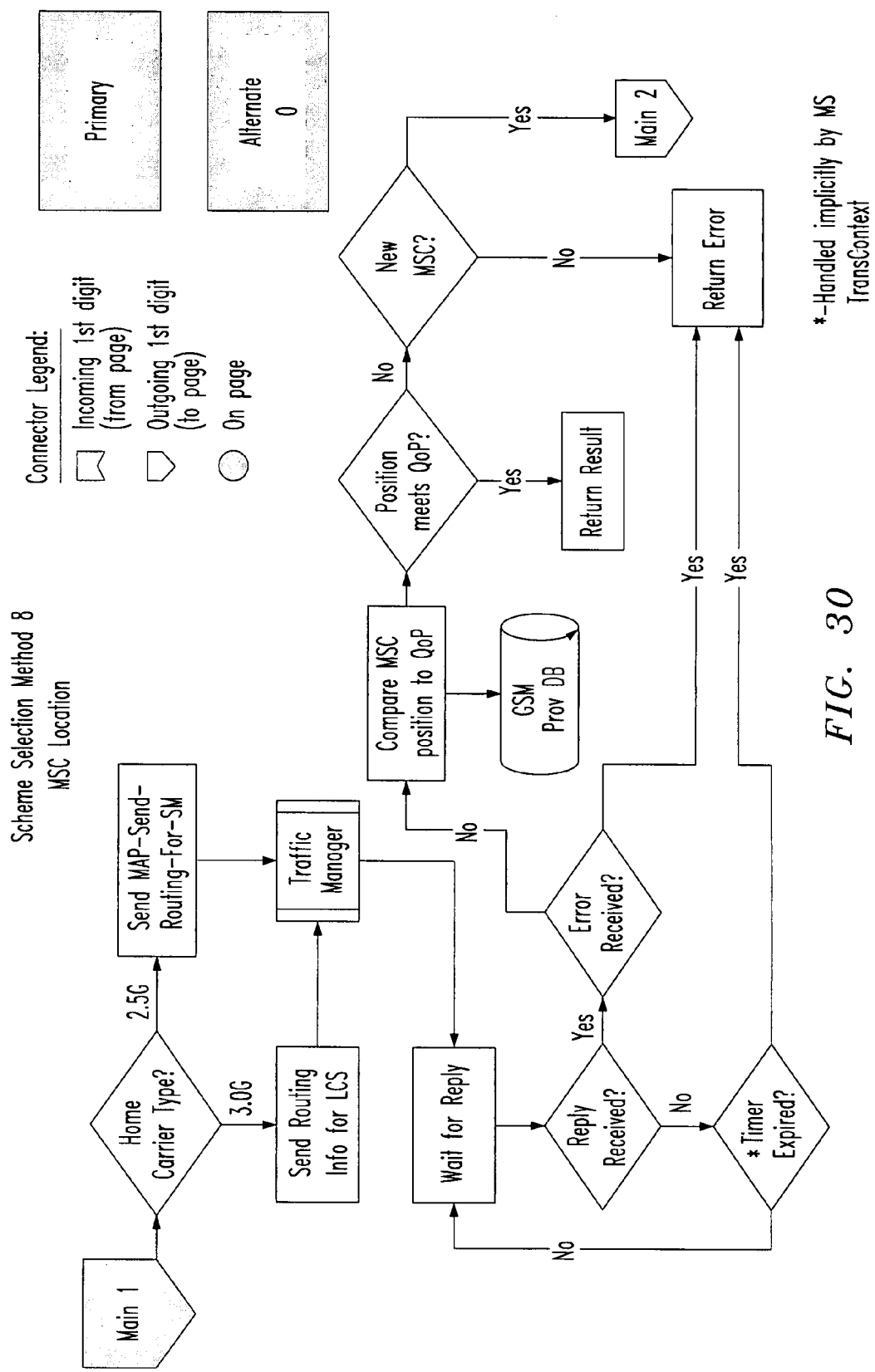
FIG. 30 shows an exemplary routine for method 8 of the scheme selection for MSC location.
Figure 31:
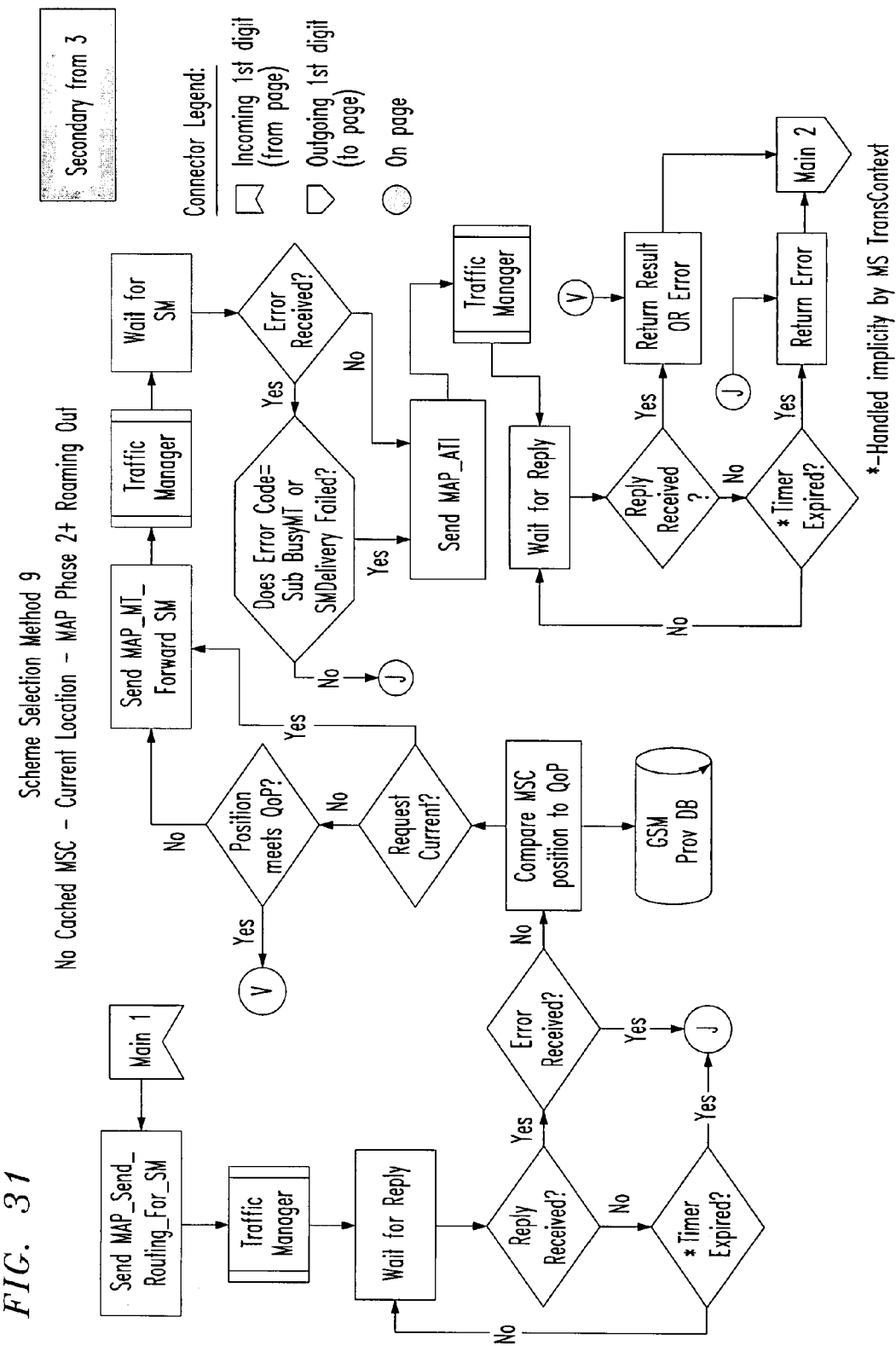
FIG. 31 shows an exemplary routine for method 9 of the scheme selection for no cached MSC-current location-MAP phase 2+ roaming out.
Figure 32:
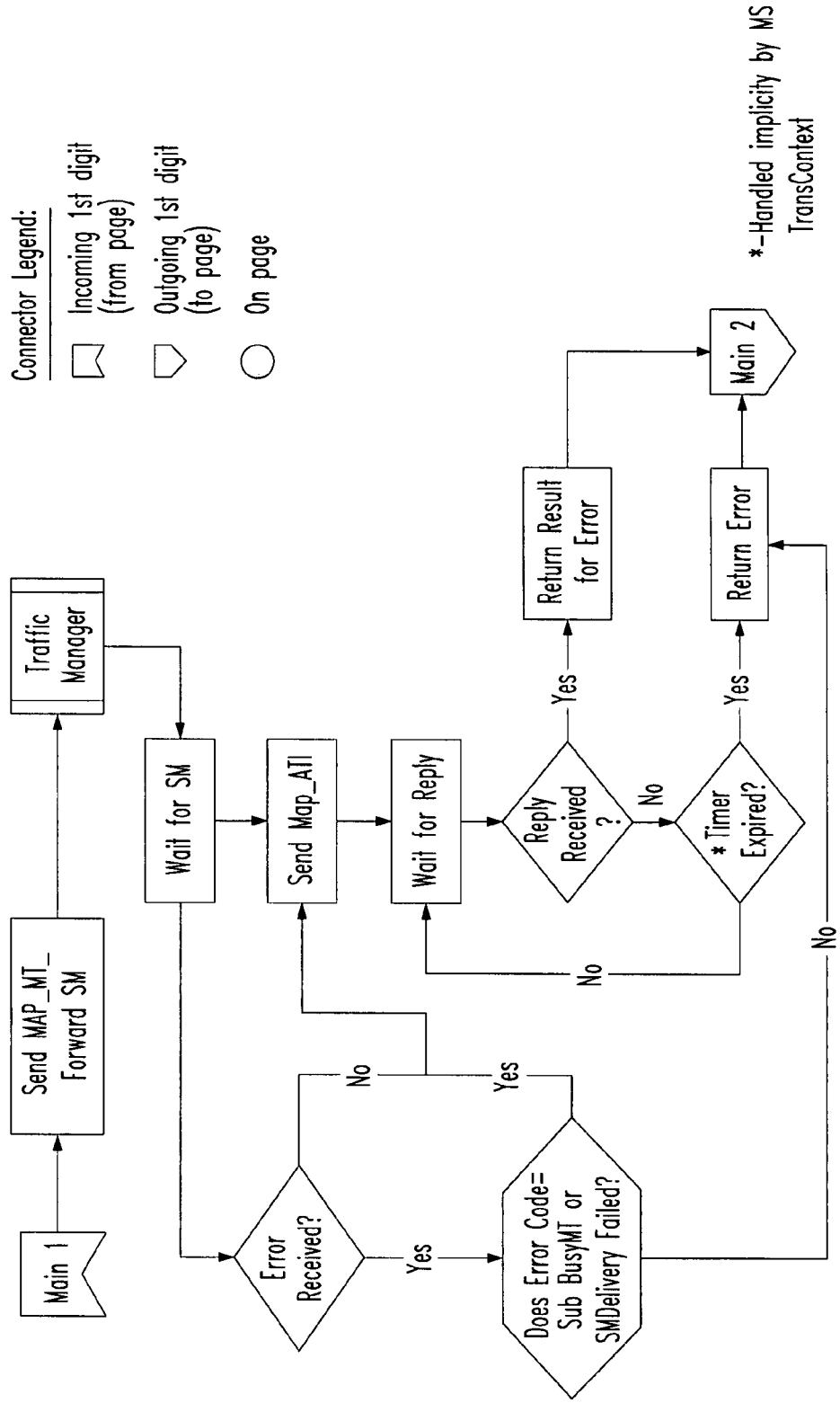
FIG. 32 shows an exemplary routine for method 10 of the scheme selection for cached MSC-current location-roaming.

FIG. 13 shows exemplary scheme selection method 8 wherein cached position information is available, in accordance with the principles of the present invention.

In particular, FIG. 13 shows method 8, which is used for the case that the cached position information is available, indicating that the serving Mobile Switch Center (Mobile Switch Center (MSC))/Serving GPRS Support Node (SGSN) supports either Mobile Application Part (MAP) version 1 or version 2, and the request Type is CURRENT.

In step 1302, a MAP_Send_Routing_For Short Message is sent by TIF 102 to Traffic Manager 603, and in step 1304 the TIF 102 waits for a reply. In step 1306 it is determined whether a reply has been received, and if a reply has been received, then the MSC position is compared to the desired Quality of Position (QoP) in step 1308 by using the PLMN database 120, and in step 1310 it is determined whether the position meets the desired QoP. If a reply has not been received, then in step 1312 it is determined whether the timer has expired, and if the timer has expired, then in step 1314 an error is returned. If the timer has not expired, then the method returns to step 1304. If the position meets the desired QoP, then a result is returned in step 1316, and if the position does not meet the desired QoP, then an error is returned in step 1314.

Other methods are possible and encompassed by the present invention. For instance, FIGS. 14 to 32 show methods of another embodiment of the present invention in accordance with the present invention.

The present invention provides a significant advantage of the reduction of unnecessary SS7 network traffic.

While the invention has been described with reference to the exemplary embodiments thereof, those skilled in the art will be able to make various modifications to the described embodiments of the invention without departing from the true spirit and scope of the invention.

What is claimed is:

1. A process of providing location information regarding a wireless client in a network, comprising:
   receiving, at a physical location server, a location information request for location information associated with a wireless device;
   selecting between a cached last known position of a relevant subscriber, and a next untried location retrieval scheme when no last known position has been retrieved;
   determining, from said physical location server, a roaming status of said wireless device; and
   selecting, with said physical location server, one of a plurality of location retrieval schemes to retrieve said location information associated with said wireless device, said selecting being based on said roaming status.

2. The process of providing location information regarding a wireless client in a network according to claim 1, further comprising:
   retrieving a best available location information from a physical memory cache.

3. The process of providing location information regarding a wireless client in a network according to claim 1, further comprising:
   returning an error as said location information if no current location information has been retrieved.

4. The process of providing location information regarding a wireless client in a network according to claim 1, further comprising:
   returning a last known location information as a best available location information if an error has been returned, when said last known position exists in a cache and has not expired.

5. The process of providing location information regarding a wireless client in a network according to claim 1, further comprising:
   setting a timer before an attempt to update said location information for said wireless device; and
   returning an error as provided location information when said timer has expired.

6. The process of providing location information regarding a wireless client in a network according to claim 1, further comprising:
   choosing as said next untried location retrieval scheme a navigational satellite system when said wireless device can access said navigational satellite system.

7. The process of providing location information regarding a wireless client in a network according to claim 1, further comprising:
   choosing said next untried location retrieval scheme according to a version number of a software application employed.

8. A method of responding in a wireless network to a location request, comprising:
   determining a requested accuracy to a response to a location request;
   based on said requested accuracy, selecting between a cached last known position of a relevant subscriber, and a next untried locating scheme when no last known position of said relevant subscriber has been retrieved;
   determining a roaming status of a relevant subscriber for which location information was requested; and
   selecting between a plurality of possible location determination schemes based on said determined roaming status of said relevant subscriber.

9. The method of responding in a wireless network to a location request according to claim 8, wherein:
   said next untried locating scheme includes use of a GPS system.

10. The method according to claim 8, wherein:
    said next untried locating scheme provides location information determined by the wireless network.

11. The method of responding in a wireless network to a location request according to claim 8, wherein:
    said next untried locating scheme includes using one of a GPS system and a land-based wireless network.

12. The method of responding in a wireless network to a location request according to claim 8, further comprising:
    determining availability of said last known position in a cache.

13. A method of responding in a wireless network to a location request, comprising:
    determining a requested accuracy to a response to a location request;
    based on said requested accuracy, selecting between retrieval of a cached last known position record of a relevant subscriber, if available, and a next untried locating scheme when no current position record has been retrieved;

determining a roaming status of a relevant subscriber for which location information was requested; and selecting between a plurality of possible location determination schemes based on said determined roaming status of said relevant subscriber.

14. The method of responding in a wireless network to a location request according to claim 13, wherein:

said last known position record is retrieved from a cache.

15. The method of responding in a wireless network to a location request according to claim 13, further comprising:

returning an error as provided location information when no current position record has been retrieved.

\* \* \* \* \*